(12) United States Patent
Little et al.

(10) Patent No.: US 9,628,269 B2
(45) Date of Patent: Apr. 18, 2017

(54) SYSTEM AND METHOD FOR SECURE MESSAGE KEY CACHING IN A MOBILE COMMUNICATION DEVICE

(75) Inventors: Herbert A. Little, Waterloo (CA); Michael G. Kirkup, Kingston (CA)

(73) Assignee: BlackBerry Limited, Waterloo, Ontario (CA)

( * ) Notice: Subject to any disclaimer, the term of this patent is extended or adjusted under 35 U.S.C. 154(b) by 2278 days.

(21) Appl. No.: 10/483,282

(22) PCT Filed: Jul. 10, 2002

(86) PCT No.: PCT/CA02/01060
§ 371 (c)(1),
(2), (4) Date: Jan. 8, 2004

(87) PCT Pub. No.: WO03/007570
PCT Pub. Date: Jan. 23, 2003

(65) Prior Publication Data
US 2004/0205248 A1    Oct. 14, 2004

Related U.S. Application Data

(60) Provisional application No. 60/304,396, filed on Jul. 10, 2001.

(51) Int. Cl.
*G06F 17/30* (2006.01)
*H04L 9/08* (2006.01)
(Continued)

(52) U.S. Cl.
CPC .......... *H04L 9/0825* (2013.01); *G06F 21/606* (2013.01); *H04L 9/3247* (2013.01);
(Continued)

(58) Field of Classification Search
CPC .... H04L 9/0825; H04L 63/062; G06F 21/606
(Continued)

(56) References Cited

U.S. PATENT DOCUMENTS 4,028,500 A    6/1977   McClure et al.
5,410,602 A *  4/1995   Finkelstein et al. .......... 380/281
(Continued)

FOREIGN PATENT DOCUMENTS

CA    2476914    2/2006
CA    2454218    1/2013
(Continued)

OTHER PUBLICATIONS

S. Dusse et al.: "S/MIME Version 2 Certificate Handling," Database IETF RFC Online IETF; RFC 2312, Mar. 1998, XP902220385, pp. 1-20 (Chapter 2.1, Chapter 4.1).
(Continued)

*Primary Examiner* — Farid Homayounmehr
*Assistant Examiner* — Suman Debnath
(74) *Attorney, Agent, or Firm* — Integral Intellectual Property Inc.; Miriam Paton; Amy Scouten

(57) ABSTRACT

A method and system are provided for processing encrypted messages at a mobile device. A mobile device receives an encrypted message that comprises encrypted content as well as encryption information for accessing the encrypted content. At the mobile device, the encryption accessing information is obtained and stored to memory. The encryption accessing information is retrieved from memory in order to decrypt the encrypted content when the encrypted message is subsequently accessed.

45 Claims, 11 Drawing Sheets

(51) Int. Cl.
*G06F 21/60* (2013.01)
*H04L 12/58* (2006.01)
*H04W 12/02* (2009.01)
*H04L 9/32* (2006.01)
*H04L 29/06* (2006.01)
*H04W 74/00* (2009.01)

(52) U.S. Cl.
CPC .......... *H04L 51/38* (2013.01); *H04L 63/0428* (2013.01); *H04L 63/062* (2013.01); *H04L 63/123* (2013.01); *H04W 12/02* (2013.01); *H04L 63/02* (2013.01); *H04L 63/168* (2013.01); *H04L 2209/60* (2013.01); *H04L 2209/80* (2013.01); *H04W 74/00* (2013.01)

(58) Field of Classification Search
USPC ........ 380/270, 277; 713/153, 155, 156, 160, 713/163; 726/5
See application file for complete search history.

(56) References Cited

U.S. PATENT DOCUMENTS

| | | | |
|---|---|---|---|
| 5,457,748 A | 10/1995 | Bergum et al. | |
| 5,623,546 A | 4/1997 | Hardy et al. | |
| 5,666,530 A | 9/1997 | Clark et al. | |
| 5,710,922 A | 1/1998 | Alley | |
| 5,727,202 A | 3/1998 | Kucala | |
| 5,778,068 A | 7/1998 | Johnson et al. | |
| 5,778,346 A | 7/1998 | Frid-Nielson | |
| 5,812,671 A | 9/1998 | Ross | |
| 5,870,030 A | 2/1999 | DeLuca et al. | |
| 5,956,707 A | 9/1999 | Chu | |
| 5,991,399 A | 11/1999 | Graunke et al. | |
| 6,000,000 A | 12/1999 | Hawkins | |
| 6,009,173 A * | 12/1999 | Sumner | 713/156 |
| 6,061,448 A | 5/2000 | Smith et al. | |
| 6,073,237 A | 6/2000 | Ellison | |
| 6,081,601 A | 6/2000 | Raivisto | |
| 6,084,968 A | 7/2000 | Kennedy et al. | |
| 6,084,969 A * | 7/2000 | Wright et al. | 380/271 |
| 6,085,323 A | 7/2000 | Shimizu et al. | |
| 6,108,788 A | 8/2000 | Moses et al. | |
| 6,119,228 A | 9/2000 | Angelo et al. | |
| 6,125,369 A | 9/2000 | Wu | |
| 6,128,724 A | 10/2000 | Lee et al. | |
| 6,141,422 A * | 10/2000 | Rimpo et al. | 380/44 |
| 6,209,098 B1 * | 3/2001 | Davis | 713/194 |
| 6,219,694 B1 | 4/2001 | Lazaridis | |
| 6,229,894 B1 * | 5/2001 | Van Oorschot et al. | 713/150 |
| 6,230,186 B1 | 5/2001 | Yaker | |
| 6,266,420 B1 * | 7/2001 | Langford et al. | 380/282 |
| 6,266,775 B1 | 7/2001 | Kamba | |
| 6,289,105 B1 | 9/2001 | Murota | |
| 6,301,658 B1 | 10/2001 | Koehler | |
| 6,313,732 B1 | 11/2001 | DeLuca et al. | |
| 6,348,972 B1 | 2/2002 | Taniguchi et al. | |
| 6,389,455 B1 | 5/2002 | Fuisz | |
| 6,531,985 B1 | 3/2003 | Jones | |
| 6,564,320 B1 | 5/2003 | de Silva et al. | |
| 6,577,734 B1 * | 6/2003 | Etzel et al. | 380/277 |
| 6,661,927 B1 | 12/2003 | Suarez et al. | |
| 6,693,964 B1 | 2/2004 | Zhang et al. | |
| 6,732,144 B1 | 5/2004 | Kizu et al. | |
| 6,745,024 B1 | 6/2004 | DeJaco et al. | |
| 6,754,276 B1 | 6/2004 | Harumoto et al. | |
| 6,779,115 B1 | 8/2004 | Naim | |
| 6,819,766 B1 * | 11/2004 | Weidong | 380/277 |
| 6,829,357 B1 | 12/2004 | Alrabady et al. | |
| 6,904,521 B1 * | 6/2005 | Jivsov | 713/155 |
| 6,918,038 B1 * | 7/2005 | Smith et al. | 726/22 |
| 6,921,532 B1 | 7/2005 | Davis et al. | |
| 6,925,568 B1 * | 8/2005 | Heinonen | 713/193 |
| 6,931,532 B1 | 8/2005 | Davis et al. | |
| 6,983,367 B2 | 1/2006 | Go et al. | |
| 6,993,137 B2 * | 1/2006 | Fransdonk | 380/279 |
| 6,996,720 B1 | 2/2006 | DeMello et al. | |
| 7,003,667 B1 | 2/2006 | Slick et al. | |
| 7,020,708 B2 | 3/2006 | Nelson et al. | |
| 7,028,186 B1 * | 4/2006 | Stenman et al. | 713/173 |
| 7,032,240 B1 | 4/2006 | Cronce et al. | |
| 7,113,927 B1 | 9/2006 | Tanaka et al. | |
| 7,127,604 B2 | 10/2006 | Lide et al. | |
| 7,171,552 B1 | 1/2007 | Bell | |
| 7,228,418 B1 | 6/2007 | Girault | |
| 7,254,712 B2 | 8/2007 | Godfrey et al. | |
| 7,299,502 B2 * | 11/2007 | Schmeling et al. | 726/29 |
| 7,499,551 B1 * | 3/2009 | Mire | 380/279 |
| 7,529,374 B2 | 5/2009 | Huttunen | |
| 7,546,453 B2 | 6/2009 | Little et al. | |
| 7,653,815 B2 | 1/2010 | Godfrey et al. | |
| 7,657,736 B2 | 2/2010 | Godfrey et al. | |
| 7,827,406 B2 | 11/2010 | Brown et al. | |
| 8,019,081 B2 | 9/2011 | Little | |
| 8,661,267 B2 | 2/2014 | Little | |
| 2001/0011308 A1 | 8/2001 | Clark et al. | |
| 2001/0037462 A1 * | 11/2001 | Bengtson | 713/201 |
| 2001/0046307 A1 | 11/2001 | Wong | |
| 2001/0050990 A1 | 12/2001 | Sudia | |
| 2002/0007453 A1 | 1/2002 | Nemovicher | |
| 2002/0019935 A1 * | 2/2002 | Andrew et al. | 713/165 |
| 2002/0032861 A1 | 3/2002 | Azuma | |
| 2002/0035685 A1 | 3/2002 | Ono et al. | |
| 2002/0035687 A1 | 3/2002 | Skantze | |
| 2002/0038420 A1 | 3/2002 | Collins et al. | |
| 2002/0051544 A1 | 5/2002 | Kikuchi et al. | |
| 2002/0053023 A1 | 5/2002 | Patterson et al. | |
| 2002/0053032 A1 | 5/2002 | Dowling et al. | |
| 2002/0059375 A1 | 5/2002 | Pivowar et al. | |
| 2002/0059383 A1 | 5/2002 | Katsuda | |
| 2002/0080752 A1 | 6/2002 | Johansson et al. | |
| 2002/0099766 A1 | 7/2002 | Tuli | |
| 2002/0112168 A1 * | 8/2002 | Filipi-Martin | H04L 63/0428 713/183 |
| 2002/0136410 A1 * | 9/2002 | Hanna | 380/277 |
| 2002/0138722 A1 * | 9/2002 | Douceur et al. | 713/153 |
| 2002/0147905 A1 | 10/2002 | Perlman | |
| 2002/0165967 A1 | 11/2002 | Morgan | |
| 2002/0169954 A1 | 11/2002 | Bandini et al. | |
| 2002/0173295 A1 | 11/2002 | Nykanen et al. | |
| 2002/0176067 A1 | 11/2002 | Charbon | |
| 2003/0002671 A1 * | 1/2003 | Inchalik et al. | 380/202 |
| 2003/0074555 A1 | 4/2003 | Fahn et al. | |
| 2003/0126085 A1 | 7/2003 | Srinivasan | |
| 2003/0172122 A1 | 9/2003 | Little et al. | |
| 2003/0198350 A1 | 10/2003 | Foster et al. | |
| 2003/0206635 A1 * | 11/2003 | Morley et al. | 380/269 |
| 2003/0212888 A1 | 11/2003 | Wildish et al. | |
| 2004/0083364 A1 | 4/2004 | Andreaux et al. | |
| 2004/0093493 A1 | 5/2004 | Bisbee et al. | |
| 2004/0133520 A1 | 7/2004 | Callas et al. | |
| 2004/0133775 A1 | 7/2004 | Callas et al. | |
| 2004/0196978 A1 | 10/2004 | Godfrey et al. | |
| 2004/0202327 A1 | 10/2004 | Little | |
| 2004/0205248 A1 | 10/2004 | Little et al. | |
| 2005/0005097 A1 | 1/2005 | Murakawa | |
| 2005/0039100 A1 | 2/2005 | Bade et al. | |
| 2005/0114671 A1 | 5/2005 | Little et al. | |
| 2005/0148323 A1 | 7/2005 | Little et al. | |
| 2005/0149442 A1 | 7/2005 | Adams et al. | |
| 2005/0163320 A1 | 7/2005 | Brown et al. | |
| 2005/0188219 A1 | 8/2005 | Annic et al. | |
| 2005/0210289 A1 | 9/2005 | Brown | |
| 2005/0222991 A1 | 10/2005 | Ikenoya | |
| 2005/0246763 A1 | 11/2005 | Corcoran et al. | |
| 2006/0015722 A1 | 1/2006 | Rowan et al. | |
| 2006/0036848 A1 | 2/2006 | Brown et al. | |
| 2006/0036849 A1 | 2/2006 | Brown et al. | |
| 2006/0036865 A1 | 2/2006 | Brown et al. | |
| 2006/0059332 A1 | 3/2006 | Adams et al. | |
| 2007/0083749 A1 | 4/2007 | Fang | |
| 2007/0118874 A1 | 5/2007 | Adams et al. | |
| 2007/0123307 A1 | 5/2007 | Adams et al. | |
| 2007/0165844 A1 | 7/2007 | Little et al. | |

(56) References Cited

U.S. PATENT DOCUMENTS

| | | | |
|---|---|---|---|
| 2008/0016359 | A1 | 1/2008 | Godfrey et al. |
| 2009/0292916 | A1 | 11/2009 | Little |
| 2010/0115264 | A1 | 5/2010 | Godfrey et al. |
| 2010/0122089 | A1 | 5/2010 | Godfrey et al. |
| 2010/0124333 | A1 | 5/2010 | Godfrey et al. |
| 2011/0320807 | A1 | 12/2011 | Little et al. |

FOREIGN PATENT DOCUMENTS

| | | |
|---|---|---|
| CN | ZL200810009944 | 12/2011 |
| CN | 1554176 | 12/2012 |
| EP | 0500222 | 8/1992 |
| EP | 0500245 | 8/1992 |
| EP | 0841770 | 5/1998 |
| EP | 0942568 | 9/1999 |
| EP | 1096725 | 5/2001 |
| EP | 1096727 | 5/2001 |
| EP | 1580953 | 9/2005 |
| EP | 1806683 | 7/2007 |
| GB | 2328125 | 2/1999 |
| JP | 06-276221 | 9/1994 |
| JP | 07-162407 | 6/1995 |
| JP | 7-509333 | 10/1995 |
| JP | 8-251221 | 9/1996 |
| JP | 09-046330 | 2/1997 |
| JP | 10-22992 | 1/1998 |
| JP | 10-107832 | 4/1998 |
| JP | 2000-10477 | 6/1998 |
| JP | 11-272581 | 10/1999 |
| JP | 11-272582 A2 | 10/1999 |
| JP | 2001-103571 | 4/2001 |
| JP | 2001-197055 | 7/2001 |
| JP | 2002-535884 | 10/2002 |
| JP | 2004-048139 | 2/2004 |
| KR | 1020030059303 | 7/2003 |
| WO | 94/12938 | 6/1994 |
| WO | 96/36934 | 11/1996 |
| WO | 9636934 | 11/1996 |
| WO | 9741661 A3 | 11/1997 |
| WO | WO 9741661 | 11/1997 |
| WO | WO 9834374 | 8/1998 |
| WO | WO 99/05814 | 2/1999 |
| WO | WO 99/06900 | 2/1999 |
| WO | 99/17564 | 4/1999 |
| WO | 99/27678 | 6/1999 |
| WO | 9927678 | 6/1999 |
| WO | WO 99/63709 | 12/1999 |
| WO | WO 00/31931 | 6/2000 |
| WO | 00/72506 | 11/2000 |
| WO | 0072506 | 11/2000 |
| WO | WO 0069114 | 11/2000 |
| WO | 0101644 A1 | 1/2001 |
| WO | 0116933 | 3/2001 |
| WO | WO 0116933 | 3/2001 |
| WO | WO 0124434 | 4/2001 |
| WO | 01/41353 | 6/2001 |
| WO | WO 01-63386 | 8/2001 |
| WO | 0171608 | 9/2001 |
| WO | WO 01/78491 | 10/2001 |
| WO | 02/101580 | 12/2002 |
| WO | 03/009561 | 1/2003 |
| WO | WO 03/005636 | 1/2003 |
| WO | 03015367 A3 | 2/2003 |
| WO | 03/079627 | 9/2003 |
| WO | 03/079628 | 9/2003 |

OTHER PUBLICATIONS

M. Brown et al.: "PGP in Constrained Wireless Devices," Proceedings of the Usenix Security Symposium, Aug. 14, 2000, pp. 247-261, XP002210575 (Chapter 1, Chapter 2, Chapter 3, Chapter 4).

Hoffman: "Enhanced Services for S/MIME," Database IETF RFC Online IETF; RFC 2634, Jun. 1999, pp. 1-58, XP002220386 (Chapter 3, pp. 24-32).

Chinese Office Action, issued Mar. 9, 2007, for Chinese Patent Application 02817741.X, along with an English translation thereof.

Stallings, W.: "S/MIME: E-Mail Gets Secure". Byte, McGraw-Hili Inc., St. Peterborough, US, vol. 23, No. 7, Jul. 1998, pp. 41-42, XP000774260.

Crocker S. et al.: "MIME Object Security Services; rfc1848.text". IETF Standard, Internet Engineering Task Force, IETF, CH, Oct. 1995, XP015007633.

Katsuro Inaya, et al., "Use Windows CE Now", ASCII, Oct. 1, 1999, vol. 23, No. 10, pp. 266-285.

Hiroyuki Sawano, Create a Secure Electronic Mail Environment with S/MIME!, @IT Security & Trust, May 30, 2001, URL. http://www.atmarkit.co.jp/fsecurity/special/04smime/smime01.html.

European Supplementary Search Report. Application No. 05826460.7, Feb. 14, 2008.

European Examination Report. Application No. 05826460.7, Apr. 4, 2008.

PCT International Search Report and Written Opinion of the International Searching Authority, International App. No. PCT/CA2005/D01956, Jul. 29, 2006.

Blom et al. "Conversational IP Multimedia Security", 4th International Workshop on Mobile and Wireless Communications Network, Sep. 9-11, 2002, pp. 147-151.

Fumy et al. Principles of Key Management, IEEE Journal on Selected Areas in Communications, VDI, 11, No. 5, Jun. 1999, pp. 785-793.

Eskicioglu et al. "A Key Transport Protocol Based on Secret Sharing Applications to Information Security", IEEE Transactions on Consumer Electronics, vol. 46, No. 4, Nov. 2002, pp. 816-824.

Kotzanikoloau et al. "Hybrid Key Establishment for Multiphase Self-Organized Sensor Networks", 6" IEEE International Symposium on a World of Wireless Mobile and Multimedia Networks, Jun. 13-16, 2005, pp. 581-587.

Korean Examination Report (English translation). Application No. 10-2007-7011342. Dated: Jul. 15, 2008.

Research in Motion Limited, Blackberry Security White Paper Release 4.0. 2005 Internet Address: http://blackberry.comlknowledgecenterpublicIlivelink.exe?func=II&objld=S2S044&objAction=browse&sort=name.

Policht, Martin, Sal Server 2005 Security—Part 3 Encryption, Database Journal Internet Address: http://www.databasejournal.com/features/mssql/article.php/34S3931.

Encrypt Pre-shared Keys in Cisco IOS Router Configuration Example, Document 1D 46420 CISCO Systems, Internet Address: htto:/lwww.cisco.com/en/US/tech/tk5S3/tk3721technologies_configuration_example09186a00801f2336.shtml.

European Examination Report dated Apr. 20, 2009, European Patent Application No. 05826460.7.

Kiely, Don, Sal Server 2005 Secures Your Data Like Never Before, Sep. 29, 2005. Internet Address: http://www.devx.comlcodemaglArticle/29351?trk=DXESS_DB.

Levien: "Protecting Internet E-Mail From Prying Eyes," Data Communications, McGraw Hill, New York, US, vol. 25, No. 6 (May 1, 1996), pp. 117-118, 120, 122, XP 000587586.

Syverson: "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE Comput. Soc., US, May 6, 1996, pp. 62-72, XP010164926.

Gong et al.: "Multicast Security and its Extension to a Mobile Environment," SRI International, Computer Science Laboratory, J.C. Baltzer AG, Science Publishers, Wireless Networks I (1995) pp. 281-295.

Brown I., et al.: "A Proxy Approach to E-Mail Security", Software Practice & Experience, John Wiley & Sons Ltd. Chichester, GB, vol. 29, No. 12, Oct. 1999 (Oct. 1999), pp. 1049-1060, XP000852351.

Subramanyam V., et al.: "Security in mobile systems", Reliable Distributed Systems, 1998 Proceedings. 17th IEEE Symposium on

(56) References Cited

OTHER PUBLICATIONS

W. Lafayette, in, USA, Oct. 20-23, 1998, Los Alamitos, CA, USA, IEEE Comput. Soc., US, Oct. 20, 1998 (Oct. 20, 1998), pp. 407-412, XP010319125.
International Search Report of Application No. PCT/CA02/00890, date of mailing Dec. 23, 2002—12 pgs.
Lai, M.K.E., et al.: "A Mobile Subscriber Proxy Preserving Writer-to-Reader Message Security", Military Communications Conference, 1996, Milcom '96, Conference Proceedings, IEEE McLean, VA, USA Oct. 21-24, 1996, New York, NY, USA, IEEE, US, Oct. 21, 1996 (Oct. 21, 1996), pp. 461-467, XP010203896.
Cole R., et al: "An Acrhitecture for a Mobile OSI Mail Access System", IEEE Journal on Selected Areas in Communications, IEEE Inc., New York, US, vol. 7, No. 2, Feb. 1989 (Feb. 1989), pp. 249-256, XP000904914.
Harris A.: "Content Privacy and Content Security Working Together", Internet Article. Content Technologies White Paper, 'Online! Sep. 1999 (Sep. 1999), XP002223158, pp. 8-9.
Torvinen V.: "Wireless PKI: Fundamentals", Internet Article, Radicchio White Paper, 'Online! 2000, XP002223159, pp. 12-13.
Mambo M., et al: "Proxy Signatures: Delegation of the Power to Sign Messages" IEICE Transactions on Fundamentals of Electronics, Communications and Computer Sciences, IEICE Tokyo, JP, vol. E79-A, No. 9, Sep. 1, 1996 (Sep. 1, 1996), pp. 1338-1353, XP000679624.
Schumacher: "AutoPGP FAQ, Version 1," Internet Newsgroup, 'Online! (Apr. 19, 1994), XP002230742.
International Search Report of Application No. PCT/CA02/00889, date of mailing Dec. 13, 2002, 10 pages.
European Search Report of Application No. EP 05022525.9-2146 dated Jan. 24, 2006—4 pgs.
Dusse et al., "S/MIME Version 2 Message Specification," Mar. 1998, pp. 1-37.
Japanese Office Action dated Jun. 17, 2009, Japanese Application No. 2006-293228.
Inquiry issued by the Japanese Patent Office on Mar. 13, 2009 for Japanese Patent Application No. 2003-504272.
Notice of Reason for Rejection issued by the Japanese Patent Office on May 12, 2006 for Japanese Patent Application No. 2003-504272.
Australian Examiner's Report issued on Oct. 12, 2006 for Australian patent application No. 2005204223.
Berson T et al: "Cryptography as a network service" 8th Annual Symposium on Network and Distributed System Security. (NDSS' 01) Internet Soc Reston, VA, USA, Feb. 7, 2001 (Feb. 7, 2001),—Feb. 9, 2001 (Feb. 9, 2001) pp. 1-12, XP002551706 *the whole document*.
Brown M., et al.: "PGP in Constrained Wireless Devices", Proceedings of the 9th Usenix Security Symposium, Denver, CO, Aug. 14-17, 2000, XP002210575.
Butrico M et al: "Enterprise data access from mobile computers: an end-to-end story" Research Issues in Data Engineering, 2000. RIDE 2000. Proceedings. Tenth International Workshop on San Diego, CA, USA Feb. 28-29, 2000, Los Alamitos, CA, USA, IEEE Comput. Soc, US Feb. 28, 2000 (Feb. 28, 2000), pp. 9-16, XP010377083.
Chadwick, D.W. et al. "Modifying LDAP to Support X.509-based PKIs", In Seventeenth Annual IFIP WG 11.3 Working Conference on Database and Applications Security at Estes Park, Colorado, Aug. 2003.
Chinese First Office Action (English translation). Application No. 200510095984.7. Dated: Nov. 21, 2008.
Chinese Office Action, issued Mar. 9, 2007, for Chinese Patent Application No. 02817741.X, along with an English translation thereof.
Deroest J.: "Ubiquitous Mobile Computing" Sunexpert Magazine, 'Online! Jul. 1998 (Jul. 1998), pp. 54-56, SP002213003 Retrieved from the Internet: <URL:http://swexpert.com/C8/SE.C8.JUL.98.pdf> 'retrieved on Sep. 10, 2002!.

Dusse et al.: "S/MIME Version 2 Certifcate Handling," Database IETF RFC Online IETF: RFC 2312, Mar. 1998, pp. 1-20 (Chapter 2.1, Chapter 4.1), XP002220385.
EPO Communication Pursuant to Article 96(2) EPC, issued by the European Patent Office on Dec. 6, 2006 in connection with application No. 04104240.9.
Hämetvaara, Vesa. "Modifying LDAP to Support X.509-based PKIs", in Seventeenth Annual IFIP WG 11.3 Working Conference on Database and Applications Security at Estes Park, Colorado, Aug. 2003.
Hoffman: "Enhanced Services for S/MIME," Database IETF RFC Online IETF; RFC 2634, Jun. 1999, pp. 1-58 (Chapter 3, pp. 24-32), XP002220386.
Housley, R et al. "Internet X.509 Public Key Infrastructure Certificate and CRL Profile (RFC 2459)", Jan. 1999.
Indian Examination Letter. Application No. 2290/DEL/2005. Dated: Apr. 13, 2007.
ITU-T, "Information technology—Open systems interconnection—The Directory: Public-key and attribute certificate frameworks", Mar. 2000.
Jin Jing et al: "Client-server computing in mobile environments" ACM Computing Surveys, Jun. 1999, ACM, USA, vol. 31, No. 2, pp. 117-157, XP002212945.
Korean Decision for Final Rejection (English translation). Application No. 10-2005-0081103. Dated: Apr. 12, 2007.
Myers, M. et al. "Certificate Management Messages over CMS (RFC 2797)", Apr. 2000.
Myers, M. et al., X.509 Internet Public Key Infrastructure Online Certificate Status Protocol—OCSP, RFC2560 (Jun. 1999).
Nakajima T et al: "Adaptive continuous media applications in mobile computing environments" Multimedia Computing Systems '97. Proceedings., IEEE International Conference on Ottawa, Ont., Canada Jun. 3-6, 1997, Los Alamitos, CA, USA, IEEE Comput. Soc. US, Jun. 3, 1997 (Jun. 3, 1997), pp. 152-160, XP010239184.
Notice of Reason for Rejection issued by the Japanese Patent Office on Feb. 16, 2009 for Japanese Patent Application No. 2005-253511.
Notice of Reason for Rejection issued by the Japanese Patent Office on Jan. 5, 2010 for Japanese Patent Application No. 2005-253511.
Ramsdell, D. et al. "Secure/Multipurpose Internet Mail Extensions (S/MIME) Version 3.1 Certificate Handling (RFC 3850)", Jul. 2004.
Research in Motion Limited, BlackBerry Security with the S/MIME Support Package, version 1.5, Dec. 17, 2003.
Russell S: "Fast checking of individual certificate revocation on small systems" Computer Security Applications Conference, 1999. (ACSAC '99). Proceedings. 15th Annual Phoenix, AZ, USA Dec. 6-10, 1999, Los Alamitos, CA, USA, IEEE Comput. Soc. US, Dec. 6, 1999 (Dec. 6, 1999), pp. 249-255, XP010368617.
Singapore Examination Report. Application No. 200505340-0. Dated: Sep. 19, 2006.
Wasley D.L. et al: "Improving Digital Credential Management in Browsers" Internet Article. HEPKI-TAG Recommendation, 'Online! Jul. 21, 2000 (Jul. 21, 2000), XP002213004 Retrieved from the Internet: <URL:http://middleware.internet2.edu/hepk i -tag/HEPKI-TAG-Certs-Browser-03.pdf> 'retrieved on Sep. 10, 2002.
Written Opinion issued on Dec. 23, 2005 by the Australian Patent Office for Singapore patent application No. 200505624-7.
Zollner J: "Gateway to overcome incompatibilities of security mechanisms" Reliable Distributed Systems, 1999. Proceedings of the 19th IEEE Sympo Sium on Lausanne, Switzerland Oct. 19-22, 1999, Los Alamitos, CAL, USA, IEEE Comput. Soc, US Oct. 19, 1999 (Oct. 19, 1999), pp. 372-377, XP010357040 ISBN: 978-0-7695-0290-8 *the whole document*.
Office Action issued by the USPTO on Jun. 23, 2010 for U.S. Appl. No. 10/486,406.
Office Action issued by the USPTO on Aug. 11, 2010 for U.S. Appl. No. 12/480,841.
Third Office Action, Chinese Application No. 02817741.X, dated Nov. 10, 2011.
Notice of Allowance (Notification for the Grant of Invention), Chinese Application No. 028197984, dated Nov. 30, 2007.
First Office Action, Chinese Application No. 200810009944.X, dated May 4, 2010.

(56) References Cited

OTHER PUBLICATIONS

EPO Communication Pursuant to Article 96(2) EPC, in connection with Application No. 02752898.3-2413, dated Jun. 2, 2004.
Second Office Action, Chinese Application No. 200810009944.X, dated May 25, 2011.
EPO Communication Pursuant to Article 96(2) EPC, in connection with Application No. 02752898.3-2413, dated Mar. 2, 2006.
EPO Communication Pursuant to Article 96(2) EPC, in connection with Application No. 02754007.9-2413 dated Jul. 26, 2006.
EPO Communication Pursuant to Article 94(3) EPC, in connection with Application No. 02752898.3-2413, dated May 6, 2010.
EPO Communication Pursuant to Article 96(2) EPC, in connection with Application No. 02754007.9-2413 dated Aug. 17, 2007.
First Office Action, Chinese Application No. 02817741.X, dated Mar. 9, 2007.
Second Office Action, Chinese Application No. 02817741.X, dated Jan. 25, 2008.
EPO Communication Pursuant to Article 71(3) EPC (Decision to Grant), in connection with Application No. 02754007.9-2413 dated May 15, 2008.
Rejection Decision, Chinese Application No. 02817741.X, dated Mar. 29, 2010.
Certificate of Grant of Patent, Hong Kong Application No. 04103998.2, dated Apr. 24, 2009.
Notice of Revocation of Rejection Decision, Chinese Application No. 02817741.X, dated Aug. 18, 2010.
International Search Report for PCT/CA02/01060 dated Nov. 26, 2002.
Written Opinion issued on Feb. 14, 2003 by European Patent Office for PCT/CA02/01060.
Office Action, Canadian Application No. 2,454,218, dated Mar. 7, 2005.
Written Opinion issued on Apr. 16, 2003 by European Patent Office for PCT/CA02/01060.
International Preliminary Examination Report for PCT/CA02/01060 dated Oct. 23, 2003.
Office Action, Canadian Application No. 2,454,218, dated Jul. 23, 2007.
International Search Report for PCT/CA02/01225 mailed Feb. 27, 2003.
Office Action, Canadian Application No. 2,454,218, dated Aug. 6, 2008.
Written Opinion issued on Jul. 1, 2003 by European Patent Office for PCT/CA02/01225.
Office Action, Canadian Application No. 2,454,218, dated May 12, 2010.
Written Opinion issued on Sep. 12, 2003 by European Patent Office for PCT/CA02/01225.
Response to Office Action from USPTO dated Dec. 12, 2006 for U.S. Appl. No. 10/486,406.
Office Action from USPTO dated Mar. 20, 2007 for U.S. Appl. No. 10/486,406.
Examiner Interview Summary Record, dated Jun. 7, 2007 for U.S. Appl. No. 10/486,406.
Response to Office Action from USPTO dated Jul. 19, 2007 for U.S. Appl. No. 10/486,406.
Advisory Action from USPTO dated Jul. 24, 2007 for U.S. Appl. No. 10/486,406.
Request for Continued Examination (RCE) dated Aug. 22, 2007 for U.S. Appl. No. 10/486,406.
Response to Office Action from USPTO dated Mar. 6, 2009 for U.S. Appl. No. 10/486,406.
Advisory Action from USPTO dated Mar. 16, 2009 for U.S. Appl. No. 10/486,406.
Notice of Appeal and Pre-Brief Appeal Conference Request to USPTO dated Jun. 24, 2009 for U.S. Appl. No. 10/486,406.
Pre-Brief Appeal Conference Decision dated Aug. 13, 2009 for U.S. Appl. No. 10/486,406.
Request for Continued Examination (RCE) dated Jun. 21, 2011 for U.S. Appl. No. 10/486,406.
Office Action from USPTO dated Nov. 10, 2009 for U.S. Appl. No. 10/486,406.
Response to Office Action from USPTO dated Feb. 12, 2010 for U.S. Appl. No. 10/486,406.
Response to Office Action from USPTO dated Sep. 16, 2010 for U.S. Appl. No. 10/486,406.
Notice of Allowance from USPTO dated Nov. 29, 2010 for U.S. Appl. No. 10/486,406.
Request for Continued Examination (RCE) dated Feb. 25, 2011 for U.S. Appl. No. 10/486,406.
Notice of Allowance from USPTO dated Mar. 22, 2011 for U.S. Appl. No. 10/486,406.
Notice of Allowance from USPTO dated Jul. 22, 2011 for U.S. Appl. No. 10/486,406.
Office Action, Canadian Application No. 2,456,839, dated Apr. 15, 2008.
International Preliminary Examination Report for PCT/CA02/01225 dated Dec. 4, 2003.
Notice of Allowance, Canadian Application No. 2,456,839, dated Sep. 4, 2009.
Second Office Action, Chinese Application No. 02819798.4, dated Jul. 20, 2007.
First Office Action, Chinese Application No. 02819798.4, dated Jun. 9, 2006.
Office Action, Canadian Application No. 2,454,218, dated Aug. 23, 2011.
Co-pending U.S. Appl. No. 13/228,485 entitled, "System and Method for Processing Encoded Messages", filed Sep. 9, 2011.
Fourth Office Action, Chinese Application No. 02817741.X, dated Mar. 31, 2012.
Notification of Grant, Chinese Application No. 200810009944.X, dated Jun. 6, 2012.
Third Office Action, Chinese Application No. 200810009944.X, dated Mar. 1, 2012.
Patent Certificate dated Dec. 5, 2012, Chinese Patent Application No. 02817741.
Patent Certificate dated Jan. 15, 2013, Canadian Patent Application No. 2,454,218.
Response in connection with European Application No. 02752898.3-2413, dated Dec. 9, 2004.
Response in connection with European Application No. 02752898.3-2413, dated Sep. 12, 2006.
Response in connection with European Application No. 02752898.3-2413, dated Nov. 15, 2010.
Notification of Grant, Chinese Application No. 02817741, dated Sep. 5, 2012.
Notice of Allowance, Canadian Application No. 2,454,218, dated Aug. 21, 2012.
Notification of Grant, Chinese Application No. 200810009944.X, dated Jul. 12, 2012.
Certificate of Invention dated Sep. 19, 2012, Chinese Patent No. ZL200810009944.X.
Response in connection with European Application No. 02754007.9-2413, dated Nov. 27, 2006.
Response in connection with European Application No. 02754007.9-2413, dated Feb. 27, 2008.
Previously co-pending U.S. Appl. No. 13/228,485 entitled, "System and Method for Processing Encoded Messages" issued as U.S. Pat. No. 8,661,267 on Feb. 25, 2014.
Documents related to U.S. Appl. No. 13/228,485 (Prosecution Documents).

\* cited by examiner

SYSTEM AND METHOD FOR SECURE MESSAGE KEY CACHING IN A MOBILE COMMUNICATION DEVICE

CROSS-REFERENCE TO RELATED APPLICATION

This application claims priority to U.S. provisional application Ser. No. 60/304,396 (entitled "System and Method for Secure Message Key Caching in a Mobile Communication Device" filed Jul. 10, 2001). By this reference, the full disclosure, including the drawings, of U.S. provisional application Ser. No. 60/304,396 is incorporated herein.

BACKGROUND

Technical Field

The present invention relates generally to the field of communications, and in particular toward processing secure messages on a mobile communication device.

Description of the State of the Art

In many known secure message exchange schemes, signatures, encryption, or both are commonly used to ensure the integrity and confidentiality of information being transferred from a sender to a recipient In an e-mail system for example, the sender of an e-mail message could either sign the message, encrypt the message or both sign and encrypt the message. These actions may be performed using such standards as Secure Multipurpose Internet Mail Extensions (S/MIME), Pretty Good Privacy™ (PGP™), OpenPGP and many other secure e-mail standards.

When an encrypted message is received, it is decrypted before being displayed or otherwise processed. Decryption is a processor-intensive operation which, on a wireless mobile communication device ("mobile device") with limited processing resources, tends to take a relatively long time. Such time delays may be unacceptable for many mobile device users.

Since the content of encrypted messages should generally remain secure even after receipt, such messages are normally saved to long term storage only in encrypted form. Therefore, each time a received encrypted message is to be opened or displayed for example, the decryption operations are to be repeated. Those skilled in the art will appreciate that there are often two decryption operations that are performed to decrypt the content of many types of encrypted messages such as S/MIME or PGP e-mail messages for example. The key which is used to decrypt the message, referred to as the session key, is first decrypted using a key associated with the recipient. The decrypted session key is then used to decrypt the message. Of these two decryption operations, decryption of the session key, which typically involves public key cryptographic operations, may require a user to enter a password or passphrase, and may be more processor intensive than the actual message decryption. As described above, these operations must normally be repeated each time the message is opened, displayed or accessed, resulting in possibly significant delays in message-related functions.

SUMMARY

In accordance with the teachings provided herein, a method and system are provided for processing encrypted messages at a mobile device. A mobile device receives an encrypted message that comprises encrypted content as well as encryption accessing information for accessing the encrypted content. At the mobile device, the encryption accessing information is obtained and stored to memory. The encryption accessing information is retrieved from memory in order to decrypt the encrypted content when the encrypted message is subsequently accessed.

When addressed to a plurality of receivers, an encrypted message may include more than one session key. The encrypted message may also be signed by a sender before or after the message is encrypted, such that a receiver verifies a signature either after or before the encrypted content is decrypted. The received messages may be e-mail messages that have been encrypted using S/MIME, PGP, OpenPGP or other secure e-mail standards.

As will be appreciated, the invention is capable of other and different embodiments, and its several details are capable of modifications in various respects, all without departing from the spirit of the invention. Accordingly, the drawings and description of preferred embodiments set forth below are to be regarded as illustrative in nature and not restrictive.

DETAILED DESCRIPTION OF THE DRAWINGS

Figure 1:
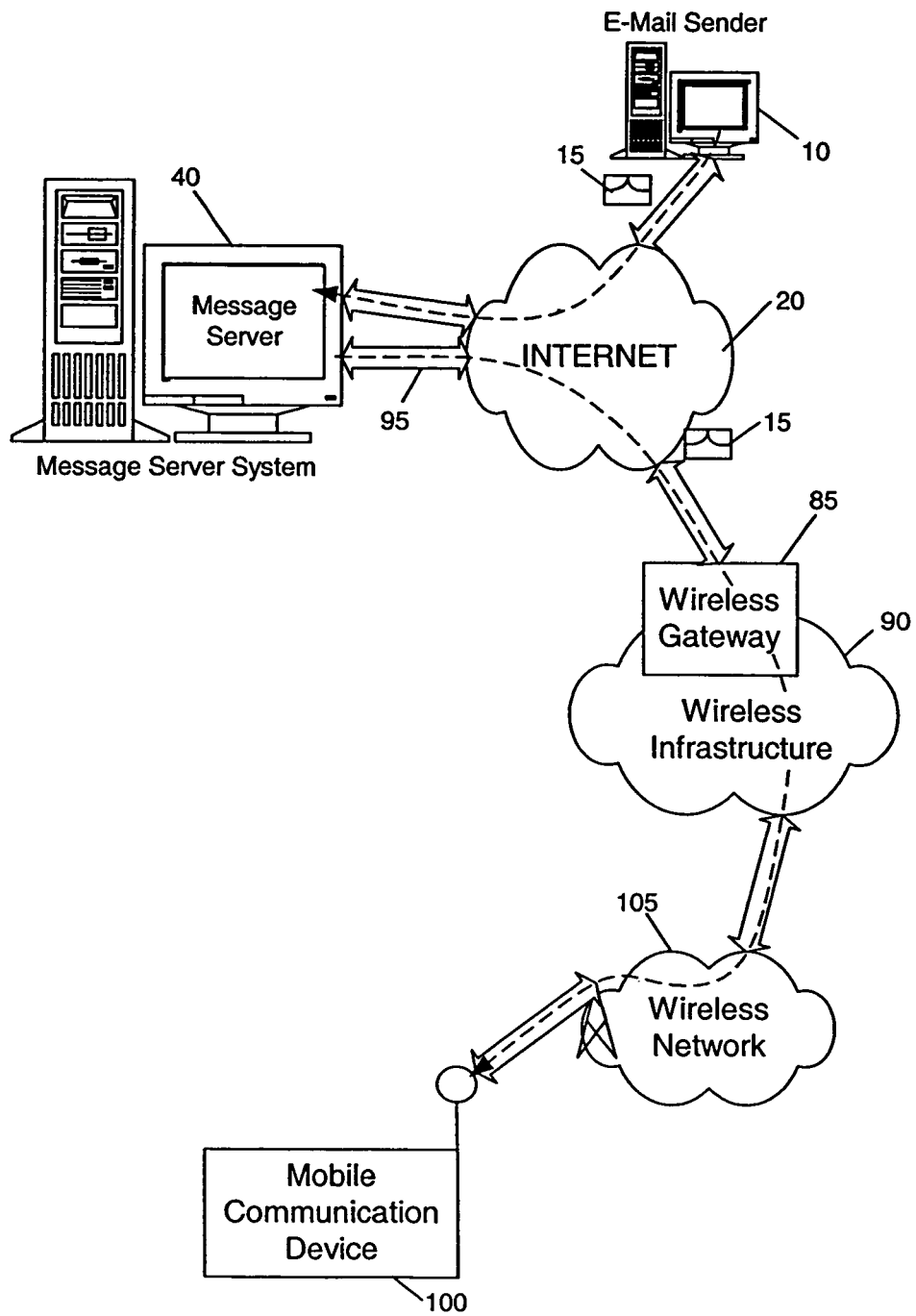
FIG. 1 is an overview of an example communication system in which a wireless mobile communication device may be used.

FIG. 1 is an overview of an example communication system in which a wireless mobile communication device may be used. One skilled in the art will appreciate there may be hundreds of different topologies, but the system shown in FIG. 1 helps demonstrate the operation of the secure message processing systems and methods described in the present application. There may also be many message senders and recipients. The system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Two common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 may determine the most likely network for locating a given user and track users as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent from by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives to the message server 40 and is normally stored in a message store. Most known messaging systems support a so-called "pull" message access scheme, wherein a mobile device requests that stored messages be forwarded by the message server to the device. Some systems provide for automatic routing of such messages which are addressed using a specific e-mail address associated with the mobile device. Messages may be addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to a mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. The term "wireless network" may include different types of networks, such as (1) data-centric wireless networks, (2) voice-centric wireless networks and (3) dual-mode networks that can support both voice and data communications over the same physical base stations. The newest of these combined dual-mode networks include, but are not limited to (1) modern Code Division Multiple Access (CDMA) networks, (2) the Groupe Special Mobile or the Global System for Mobile Communications (GSM) and the General Packet Radio Service (GPRS) network both developed by the standards committee of CEPT, and (3) the future third-generation (3G) networks like Enhanced Data-rates for Global Evolution (EDGE) and Universal Mobile Telecommunications Systems (UMTS). GPRS is a data overlay on the very popular GSM wireless network, operating in virtually every country in Europe. Some older examples of data-centric network include the Mobitex™ Radio Network, and the DataTAC™ Radio Network. Examples of older voice-centric data networks include Personal Communication Systems (PCS) networks like GSM and TDMA systems that have been available in North America and world-wide for nearly 10 years.

Figure 2:
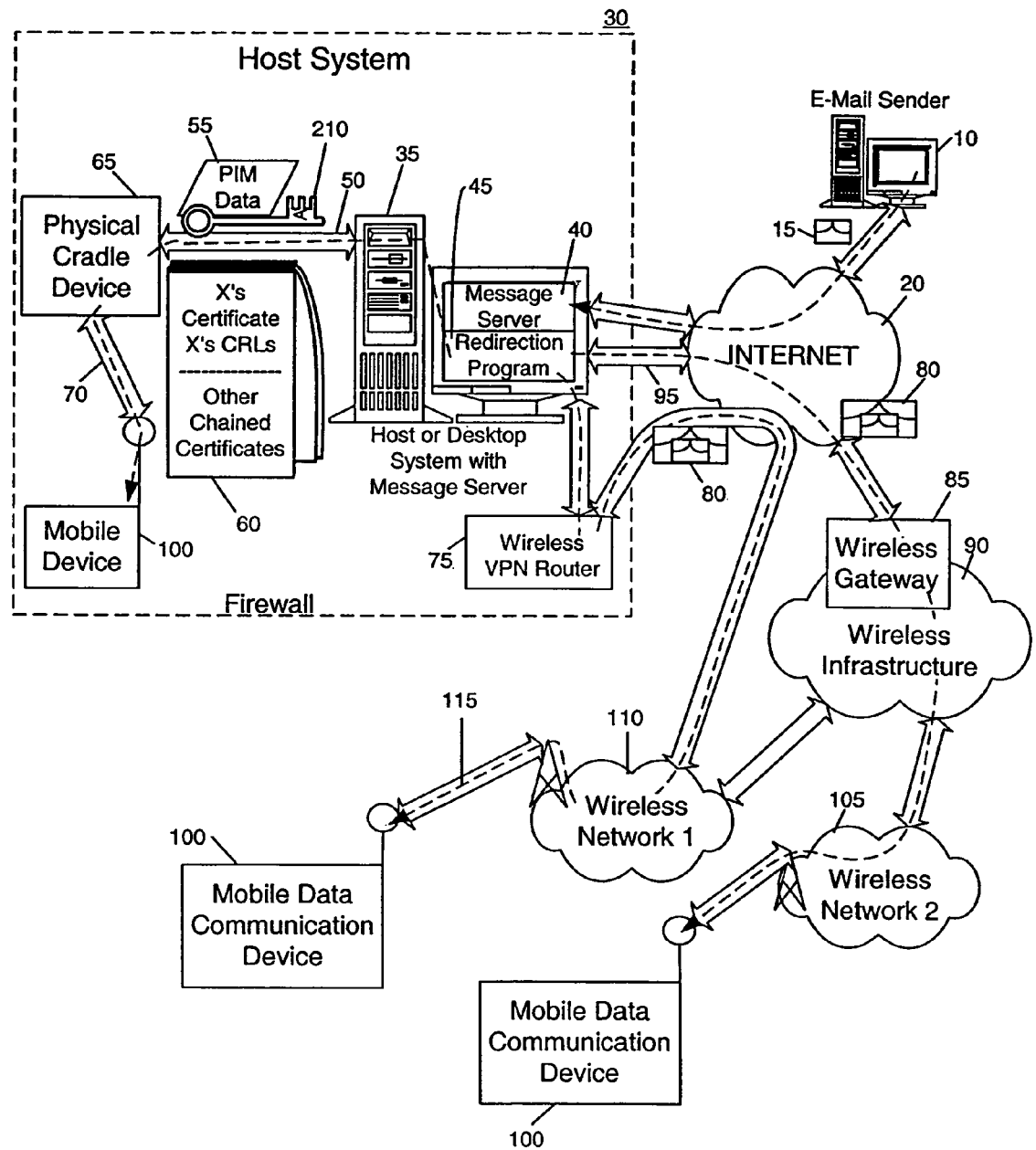
FIG. 2 is a block diagram of a further example communication system including multiple networks and multiple mobile devices.

FIG. 2 is a block diagram of a further example communication system including multiple networks and multiple mobile devices. The system of FIG. 2 is substantially similar to the FIG. 1 system, but includes a host system 30, a redirection program 45, a mobile device cradle 65, a wireless virtual private network (VPN) router 75, an additional-wireless network 110 and multiple mobile devices 100. As described above in conjunction with FIG. 1, FIG. 2 represents an overview of a sample network topology. Although the secure message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other secure system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001, and U.S. patent application Ser. No. 09/401,868, Ser. No. 09/545,963, Ser. No. 09/528,495, Ser. No. 09/545,962, and Ser. No. 09/649,755, all of which are hereby incorporated into the present application by reference. This push technique may use a wireless friendly encoding, compression and encryption technique to deliver all information to a mobile device thus effectively extending the security firewall to include each mobile device 100 associated with the host system.

As shown in FIG. 2, there may be many alternative paths for getting information to the mobile device 100. One method for loading information onto the mobile device 100 is through a port 50 designated, using a device cradle 65. This method tends to be useful for bulk information updates often performed at initialization of a device 100 with the host system or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a wireless device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection may be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives to the message server 40 and is redirected by the redirection program 45 to the mobile device 100. As this redirection takes place, the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 may use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

Turning back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 210 such as an S/MIME specific private key, the Certificate (Cert) of the user and their Certificate Revocation Lists (CRLs) 60. The private key may be exchanged so that the desktop 35 and mobile device 100 share one personality and one method for accessing all mail. The Cert and CRLs are normally exchanged because they represent the largest part of S/MIME, PGP and other public key security methods. A certificate chain involves an individual getting a Cert and then including other Certs to verify the original Cert. Eventually in the Cert chain the receiver of the message is able to confirm a root Cert from a trusted source, perhaps from a large Public Key Server (PKS) associated with a Certificate Authority (CA) such as Verisign or Entrust for example, both prominent companies in the area of public key cryptography. Once such a root Cert is found, a signature can be verified and trusted, since both the sender and receiver trust the source of the root Cert, Verisign for example.

Although the secure message processing systems and methods described herein are in no way dependent upon pre-loading of information from a host computer or a computer 35 in a host system 30 through a port arrangement, such pre-loading of typically bulky information such as Certs and CRLs may facilitate transmission of secure messages to mobile devices 100. If an alternate mechanism for transferring secure messages such as S/MIME or PGP e-mail messages to a mobile communication device is available, the secure messages may be processed as described herein.

Having described several typical communication network arrangements, the transfer and processing of secure e-mail messages will now be described in further detail.

Secure e-mail messages generated using the S/MIME and PGP techniques normally include encrypted information, a session key which is used to decrypt the encrypted information and possibly a digital signature. This is generally referred to in the art as the hybrid approach, in that information content is encrypted using a less intensive session key and encryption algorithm, whereas the more processor-intensive public key crypto is used to encrypt only the session key in order to send the session key to the device. Those skilled in the art will appreciate that S/MIME messages might only be signed and not necessarily be encrypted, however the processing systems and methods described herein are applicable to encrypted messages, whether signed or not signed.

A digital signature may, for example, be generated by a message sender by taking a digest of a message and signing the digest using the sender's private key. A digest may be a check-sum, CRC or other non-reversible operation such as a hash on the message, which is then signed. The signed digest, the Cert of the sender, and any chained Certs and CRLs may all be appended to the outgoing message. The receiver of this signed message also takes a digest of the message, then retrieves the sender's public key, checks the Cert and CRLs to ensure that the Cert is valid and trusted, and verifies the digest signature. Finally, the two digests are compared to see if they match. If the message content has been changed, then the digests will be different or the digest signature will not be verified. A digital signature does not prevent anyone from seeing the contents of the message, but does ensure the message has not been tampered with and is from the actual person as indicated on the 'From' field of the message.

In encrypted S/MIME message operations, a one-time session key is generated and used for each message, and is never re-used for other messages. The session key is then further encrypted using the receiver's public key. If the message is addressed to more than one receiver, the same 'session key is encrypted using the public key of each receiver. Only when all receivers have an encoded session key is the message then sent to each receiver. Since the e-mail retains only one form, all encrypted session keys are sent to every receiver, even though they cannot use these other session keys. Each receiver then locates its own session key, possibly based on a generated recipient information summary of the receivers that may be attached to the message, and decrypts the session key using its private key. Once the session key is decrypted, it is then used to decrypt the message body. The S/MIME recipient information attachment can also specify a particular encryption scheme that is used to decrypt the message. This information is normally placed in the header of the S/MIME message.

As mentioned briefly above, the secure message processing systems and methods described herein relate primarily to encrypted messages, which may or may not be signed. An encrypted message as processed herein may be encrypted and not signed, encrypted and then signed, or signed and then encrypted.

Figure 3:
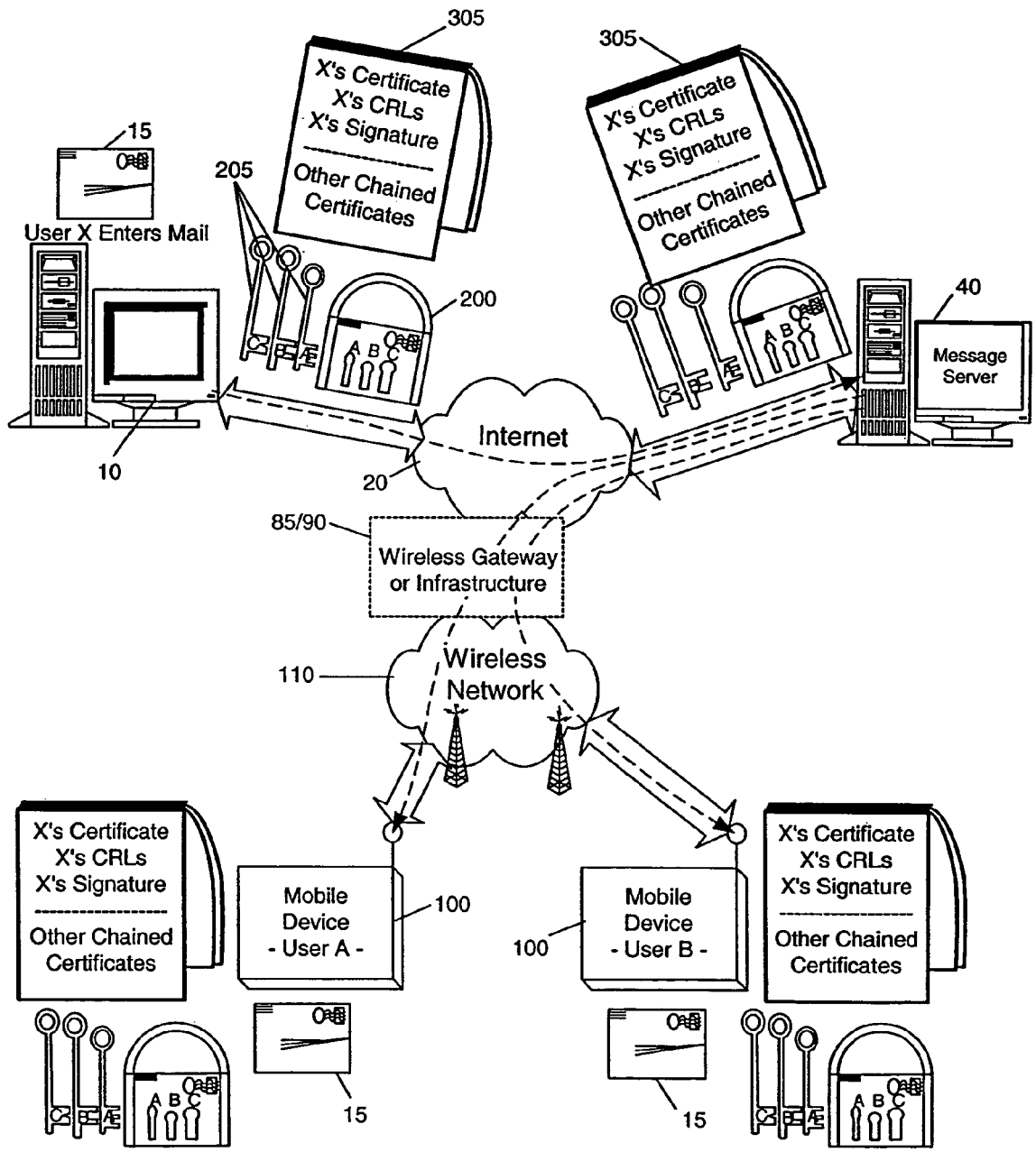
FIG. 3 illustrates a system for transferring messages that were encrypted and possibly signed using S/MIME or similar techniques.

Referring now to FIG. 3, secure message transfer will be described in further detail. FIG. 3 illustrates a system for transferring messages that were encrypted Land possibly signed using S/MIME or similar techniques. FIG. 3 shows an encrypted and signed message as an illustrative example only. The secure message processing systems and methods described herein may be applied to both signed and unsigned encrypted messages.

In FIG. 3, User X at system 10 creates a mail message 15 and decides to encrypt and sign the message. To achieve this, the system 10 first creates a session key and encrypts the message. Then the public key for each recipient is retrieved from either local storage or a Public Key Server (PKS) (not shown) on the Internet 20, for example, if public key cryptography is used. Other crypto schemes may instead be used, although public key cryptography tends to be common, particularly when a system includes a large number of possible correspondents. In a system such as shown in FIG. 3, there may be millions of e-mail systems such as 10 that may from time to time wish to exchange messages with any other e-mail systems. Public key cryptography provides for efficient key distribution among such large numbers of correspondents. For each recipient, the session key is encrypted, as shown at A, B and C for three intended recipients, and attached to the message preferably along with the recipient information (e.g., RecipientInfo section). Once the encryption is complete, a digest of the new message, including the encrypted session keys, is taken and this digest is signed using the sender's private key. In the case where the message is signed first a digest of the message would be taken without the encrypted session keys. This digest, along with all the signed components, would be encrypted using a session key and each session key would be further encrypted using each recipients public key if public key crypto is used, or another key associated with each recipient if the sender is able to securely exchange e-mail with one or more recipients through some alternate crypto arrangement.

This encrypted and signed message 200, with the session keys 205 and digital signature and signature-related information 305, is sent to the message server 40 running on a computer system. As described above, the message server 40 may process the message and place it into the appropriate user's mailbox. Depending upon the mobile device e-mail access scheme, a device 100 may request the e-mail from the message server 40, or redirection software 45 (see FIG. 2) may detect the new message and begin the redirection process to forward the new e-mail message to each recipient that has a mobile device 100. Alternatively, the e-mail message and attachments may possibly be sent directly to a mobile device 100 instead of or in addition to a message server system. Any of the transfer mechanisms described above, including over the Internet 20 through a wireless gateway and infrastructure 85/90 and one or more wireless networks 110 or through the Internet 20 and wireless network 110 using a wireless VPN router 75 (FIG. 2). Other transfer mechanisms that are currently known or may become available in the future, may also be used to send the message and attachments to a mobile device 100.

FIG. 3 illustrates receipt of the entire message on each mobile device 100. Before the message is sent to a mobile device 100, the signature or encryption sections of the message may instead be re-organized and only the necessary portions sent to each mobile device 100, as described in detail in U.S. patent applications, Ser. No. 60/297,681, titled "An Advanced System and Method for Compressing Secure E-Mail for Exchange with a Mobile Data Communication Device", filed on Jun. 12, 2001, and Ser. No. 60/365,535, titled "Advanced System And Method For Compressing Secure E-Mail For Exchange With A Mobile Data Communication Device", filed on Mar. 20, 2002, both assigned to the assignee of the present application and incorporated in their entirety herein by reference. These earlier applications disclose several schemes for rearranging secure messages and limiting the amount of information sent to a mobile device. For example, in accordance with one scheme described in the above applications, the message server system determines the appropriate session key for each mobile device and sends only that encrypted session key with the message to the mobile device. The above applications also disclose techniques for limiting signature-related information that is to be sent to a mobile device with an encrypted and signed message. For example, a message server may verify digital signature in a signed message and send the mobile device the result of the verification.

Although FIG. 3 shows entire messages, with all encrypted session keys and signature-related attachments, at each mobile device 100, the present encrypted message processing techniques require only that the encrypted session key be forwarded to the mobile device with the message. Other encrypted session keys and signature information may or may not necessarily be received at the mobile device. For example, when an encrypted message includes a plurality of encrypted session keys associated with different recipients, the encrypted message may be reorganized prior to transmission to a mobile device 100 such that the encrypted message is transmitted to the mobile device containing only the encrypted session key associated with the mobile device. Referring again to FIG. 3; the message server 40 may, for example, determine the encrypted session key associated with the mobile device of User A, and reorganize the received encrypted message such that the encrypted message is sent to User A's mobile device 100 without containing an encrypted session key that is not associated with User A or User A's mobile device 100.

If the message is not signed, such that X's signature and other signature-related information including X's CRLs, X's Cert and other chained Certs would not be part of the message, or the message was signed before it was encrypted, then when a user of a mobile device 100 opens the message, the appropriate encrypted session key is found and decrypted. However, if the message was signed after being encrypted then the signature is preferably first verified and the correct session key is then found and decrypted. As those skilled in the art will appreciate, session key decryption commonly involves the further security operation of entering a password or passphrase preferably known only to the user of a mobile device.

When the session key is decrypted, it is stored in a temporary storage area such as in a random access memory (RAM) on a mobile device 100. The next time the message is opened, the stored version of the decrypted key is retrieved from memory. In known systems, the session key is decrypted, after a password or passphrase is entered, each time an encrypted message is opened. By storing the decrypted key in memory, only a memory access operation, which would be much faster than a key decryption operation, is performed to subsequently decrypt an encrypted message for which a session key has already been decrypted.

The temporary storage area in which the decrypted session key is stored is preferably in a volatile and non-persistent store. The decrypted key may, for example, be stored for only a particular period of time, which may preferably be set by a user. A single key storage time period may be set and applied to all messages, although more customized settings are also contemplated. Particularly sensitive messages that normally arrive from certain senders or from senders whose e-mail addresses have the same domain name, for example, may have as specific relatively short decrypted session key storage period, whereas decrypted session keys for encrypted e-mails received from other senders, perhaps personal contacts, may be stored for a longer period of time. Alternatively, a user may be prompted for a storage time period each time a message is opened or closed. The decrypted key storage feature might also be disabled for certain messages or messages received from certain senders. Session key storage operations may possibly be automatically controlled by detection of specific predetermined keywords in a message. For example, the text "Top Secret" in an e-mail subject line may be detected by the device when the e-mail is decrypted and prevent the decrypted session key from being stored or delete the session key from storage if it had already been stored.

The particular criteria controlling decrypted session key storage may be determined in accordance with the desired level of security of encrypted messages at a mobile device. Storage of the session key represents a trade-off between usability and security. Longer key storage intervals improve usability at the cost of decreased security, since an encrypted message may be decrypted for a longer period of time after first being decrypted without having to decrypt the session key. A shorter key storage interval reduces the amount of time that encrypted message contents remain accessible to an unauthorized user of a device. When the decrypted session key is removed from storage, an unauthorized user would preferably be required to first correctly enter the device user's password or passphrase in order to decrypt and view encrypted message content.

Figure 4:
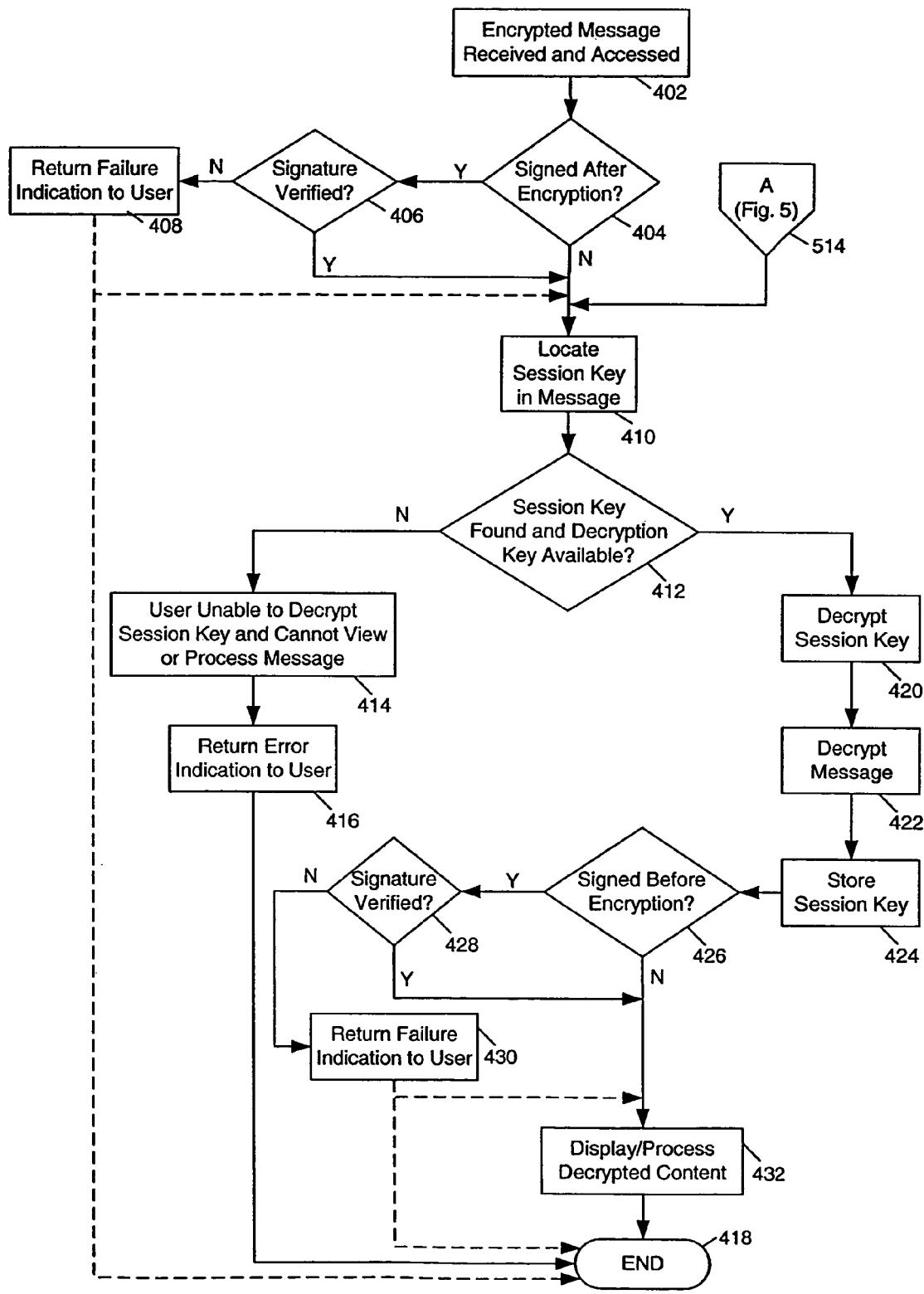
FIG. 4 is a flow diagram representing a method for initial processing of a secure message.

FIG. 4 is a flow diagram representing a method for initial processing of a secure message. At step 402, a received encrypted message is accessed for the first time. If the received message was signed by the sender after being encrypted, as determined at step 404, then the device will attempt to verify the digital signature. If the digital signature is properly verified at step 406, for example by determining a match between digests as described above, processing continues at step 410. Otherwise, the user will typically be given some indication that the signature verification failed, at step 408. Depending upon the particular signature scheme implemented or perhaps in response to a user selection to end processing, a message might not be further processed if the signature cannot be verified, and processing ends at step 418. However, in certain circumstances, the user may wish to proceed to view or otherwise process the message, even though the digests do not match and thus the message content may have been altered after the sender signed the message.

If the message was not signed after being encrypted (step 404), when the digital signature is verified (step 406), or processing should continue after a failed signature verification attempt (step 408), the receiving device then locates its corresponding session key in the message at step 410. However, if the session key could not be found or the key required to decrypt the session key is not available, as determined at step 412, for example if the user does not input a correct password or passphrase, then the device cannot decrypt the session key or the message (414) and an error is preferably returned to the user at step 416. When a session key is found and the required decryption key is available (i.e. a correct password or passphrase is entered) on the device, the session key is then decrypted at step 420 and used to decrypt the message, at step 422. The decrypted session key is then preferably stored to a non-persistent store at step 424. Any determinations relating to whether or not the decrypted session key should be stored or for how long the decrypted key should be stored would be performed as part of step 424.

Where the message was signed by the sender before being encrypted, as determined at step 426, the digital signature is preferably verified at steps 428 and 430, substantially as described above in reference to steps 406 and 408. The decrypted message is then displayed or processed at step 432, if the message was not signed after being encrypted, after the signature is verified, or when processing should continue after a signature verification failure. The process ends at step 418.

Figure 5:
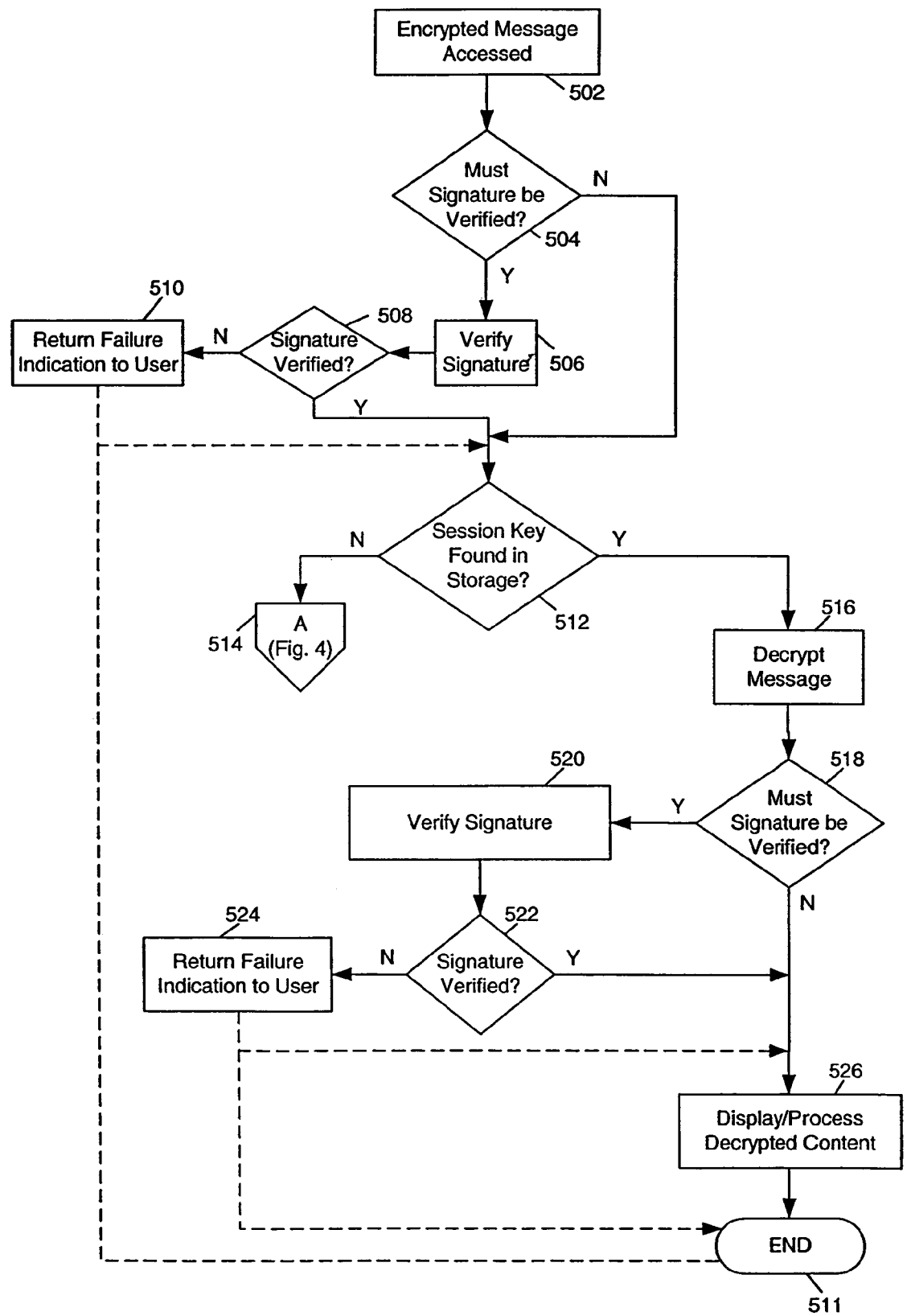
FIG. 5 is a flow diagram of a secure message processing method for previously decrypted messages.

FIG. 5 is a flow diagram of a secure message processing method for previously decrypted messages. Step 502 represents an operation of accessing an encrypted message that has previously been decrypted. New encrypted messages are processed as described above and shown in FIG. 4. Since the message being accessed in step 502 has previously been decrypted, a post-encryption digital signature appended to the message may have already been verified. If not, or if the signature should be verified again, for example where a new CRL has been loaded onto the device, a positive determination is made at step 504. At step 506, signature verification operations are performed. Steps 508 and 510 operate substantially as described above in reference to the signature verification steps 406 and 408 in FIG. 4. Where the signature cannot be verified, processing may either end at step 511 or continue at step 512.

If the digital signature need not be verified, is verified, or processing should continue even if a digital signature could not be verified, then the mobile device, or more likely crypto software operating on the mobile device, checks to see if the decrypted session key for the message is currently in storage, at step 512. As described above, the session key is preferably stored in a non-persistent store and may be stored for a certain time period. If a time period has expired, the device has lost power or been turned off since the session key was stored, or the session key was not stored at all, then processing reverts to initial message processing at step 410 (FIG. 4), as indicated at 514. Since the session key is not in memory, it is decrypted again in order to decrypt the message.

When the decrypted session key is found in storage, then the stored decrypted key is used to decrypt the message at step 516. The session key decryption operation is avoided and the message can thereby be displayed or processed much more quickly than in known secure message processing schemes. As above, if the message was signed before encryption, the digital signature may or may not be verified (518, 520, 522, 524) before the message or its contents are displayed or processed at step 526.

Those skilled in the art will appreciate that a secure message processing method need not necessarily include all of the steps shown in FIGS. 4 and 5 or may include further steps and operations in addition thereto. If the secure messaging scheme does not involve signatures, then the signature verification steps would not be executed. The operations may also be performed in a different order. For example, the decrypted session key may be stored before the message is decrypted. Other variations of the methods and systems described above will be apparent to those skilled in the art and as such are considered to be within the scope of the invention.

For example, although described primarily in the context of a mobile communication device, the encrypted message processing systems and methods described above may reduce processor load and time delays associated with viewing or otherwise accessing encrypted messages for which respective session keys have been previously decrypted. Session key decryption operations tend to involve much smaller time delays on desktop computer systems which typically have faster and much more powerful processors than smaller hand-held and portable devices. The power consumption associated with such processor intensive decryption operations also tends to be less of a concern in desktop or other larger computer systems with virtually unlimited power sources. However, the systems and methods described above may nonetheless provide for faster and less intensive encrypted message decryption in such systems.

Figure 6:
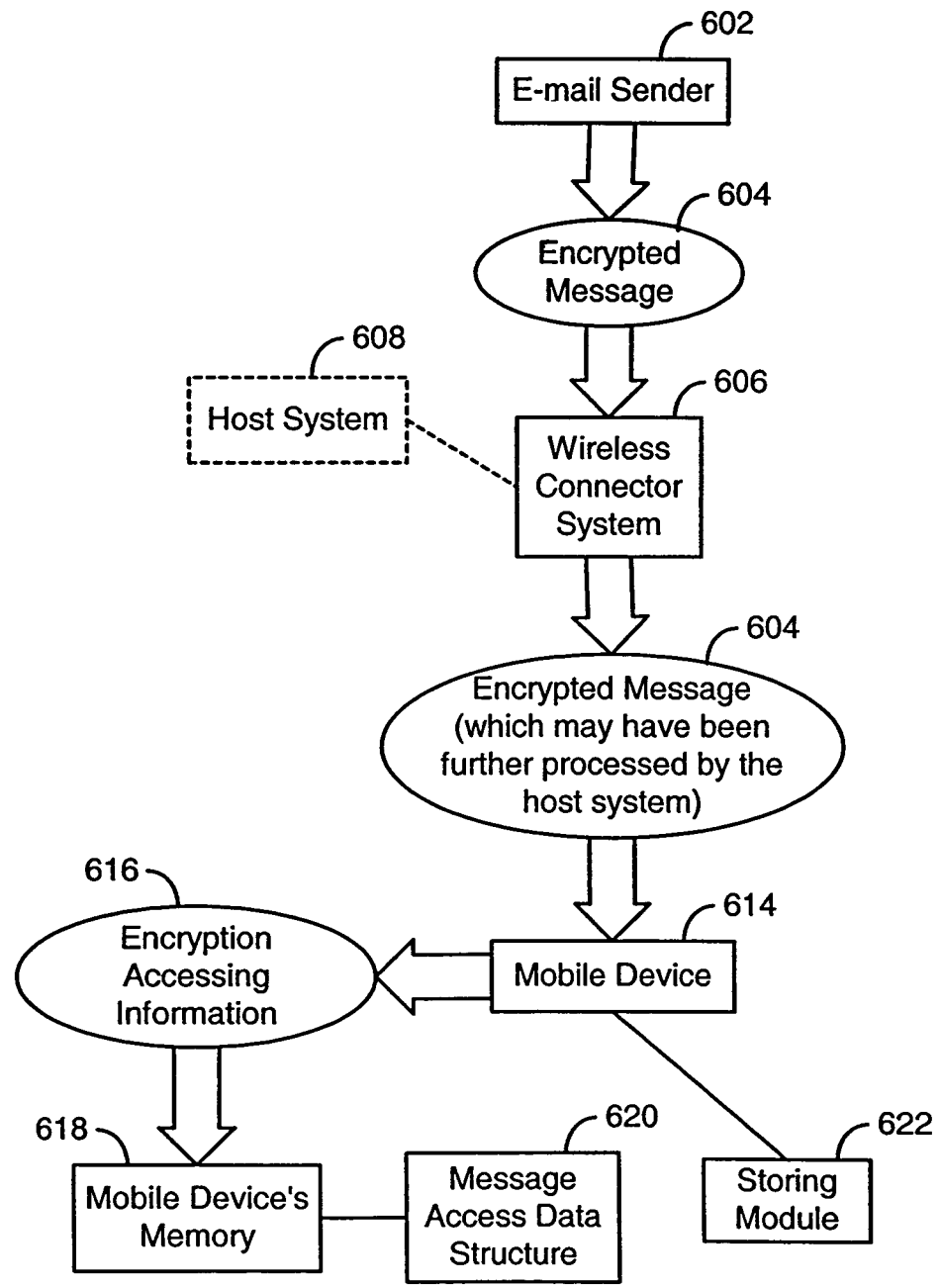
FIGS. 6 and 7 are block diagrams depicting processing of messages involving a mobile device.
Figure 7:
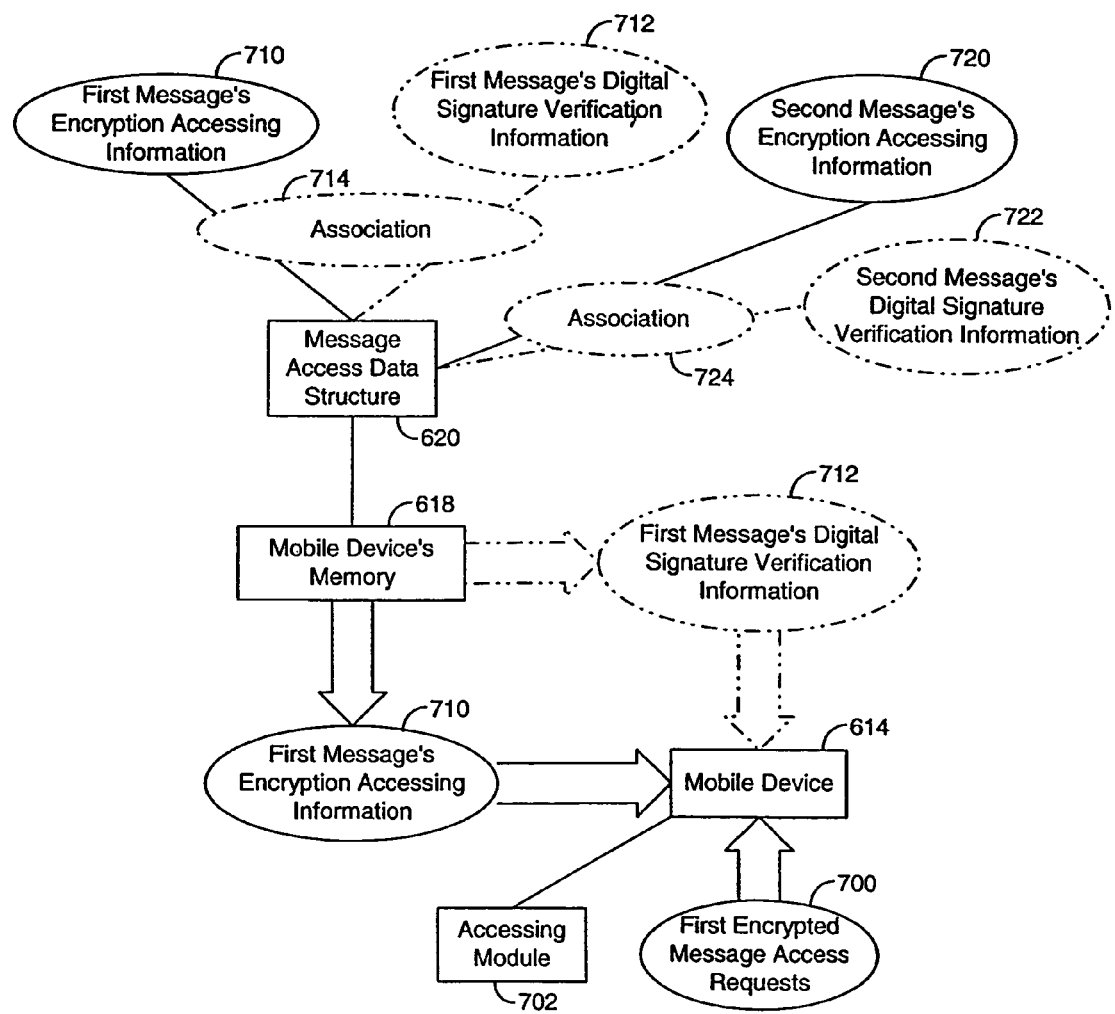

As further examples of the wide scope of the systems and methods described herein, FIGS. 6 and 7 illustrate additional situations where encrypted messages are handled by a mobile device. FIG. 6 depicts an example wherein a wireless connector system 606 transmits a message 604 from a sender 602 that is addressed to one or more message receivers. In this example, the sender's message 604 is an encrypted message that includes encrypted content and further includes encryption accessing information (e.g., a session key or other equivalent technique) which allows the decryption of the encrypted content.

The wireless connector system 606 may use a host system 608 in its transmission of the message 604 to a mobile device 614. The wireless connector system 606 may perform authentication and/or encryption message processing upon the sender's message 604, or the wireless connector system may be of the type that does not perform any authentication and/or encryption message processing.

The encrypted message 604 is then transmitted to the mobile device 614. The mobile device 614 extracts the message's encryption accessing information and uses a storage software module 622 to store the encryption accessing information 616 in memory 618 which is volatile and non-persistent. The memory 618 may include a message access data structure 620 to store the encryption accessing information 616 in the memory 618.

FIG. 7 depicts a message access data structure 620 where encrypted content is accessed multiple times. In this example, several messages' accessing information is stored in the message access data structure 620, such as encryption accessing information 710 for a first message and encryption accessing information 720 for a second message. If the encrypted contents of the first message are accessed multiple times as shown at 700, then the mobile device 614 uses an accessing software module 702 to retrieve the first message's encryption accessing information 710 from memory 618. The retrieved information 710 is used to decrypt the encrypted content for use by the user of the mobile device or by a software application that requested the content.

The system and method may be expanded to store digital signature verification information (712, 722) in the message access data structure 620. In this situation, the accessing software module 702 retrieves the first message's digital signature verification information 712 if the information is needed to verify a digital signature of the first message. Associations (714, 724) may be formed in the message access data structure 620 to indicate which encryption accessing information is associated with which digital signature verification. In this way, the accessing software module 702 may recognize which data is associated with which messages.

Figure 8:
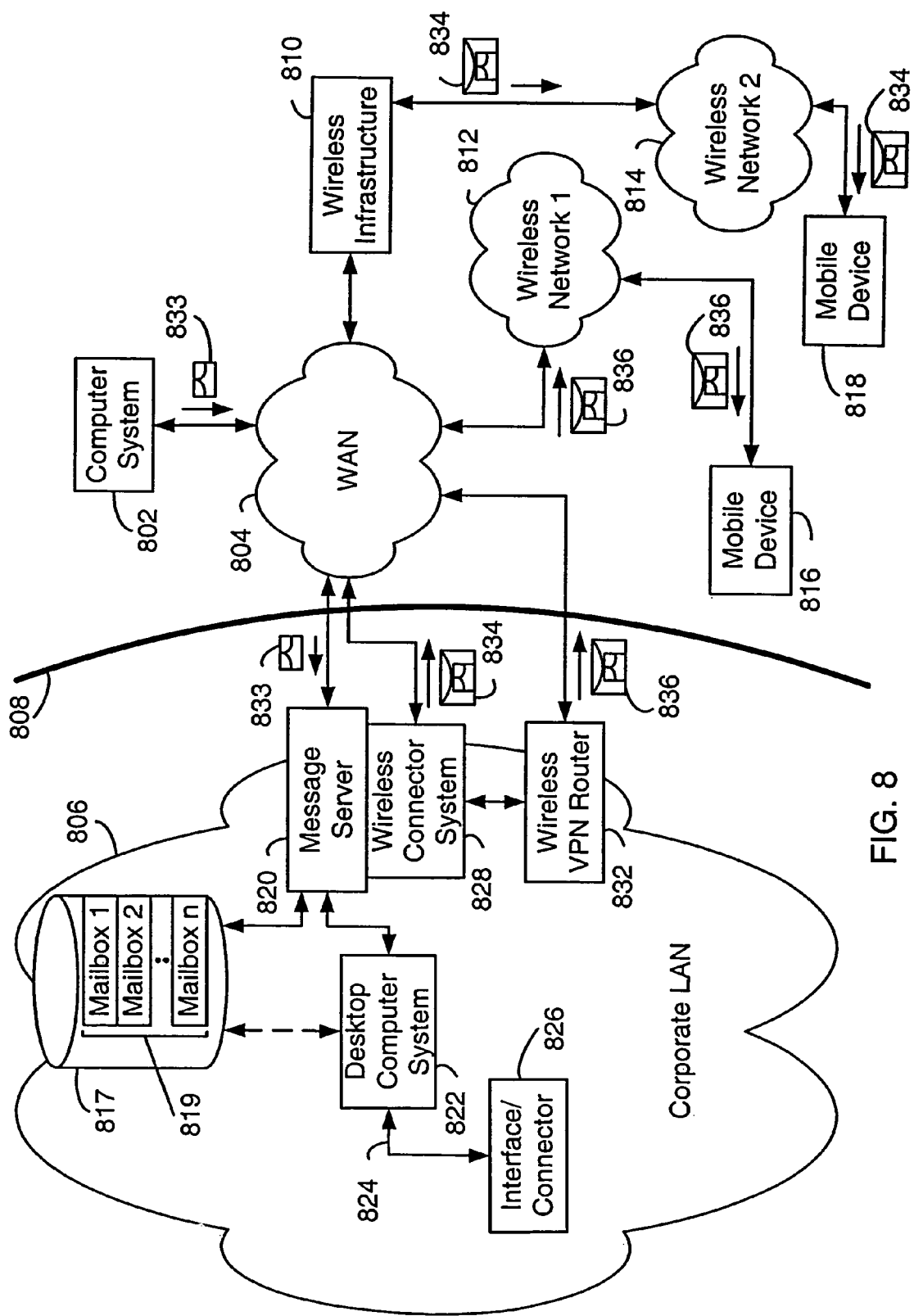
FIG. 8 is a block diagram showing an example communication system.
Figure 9:
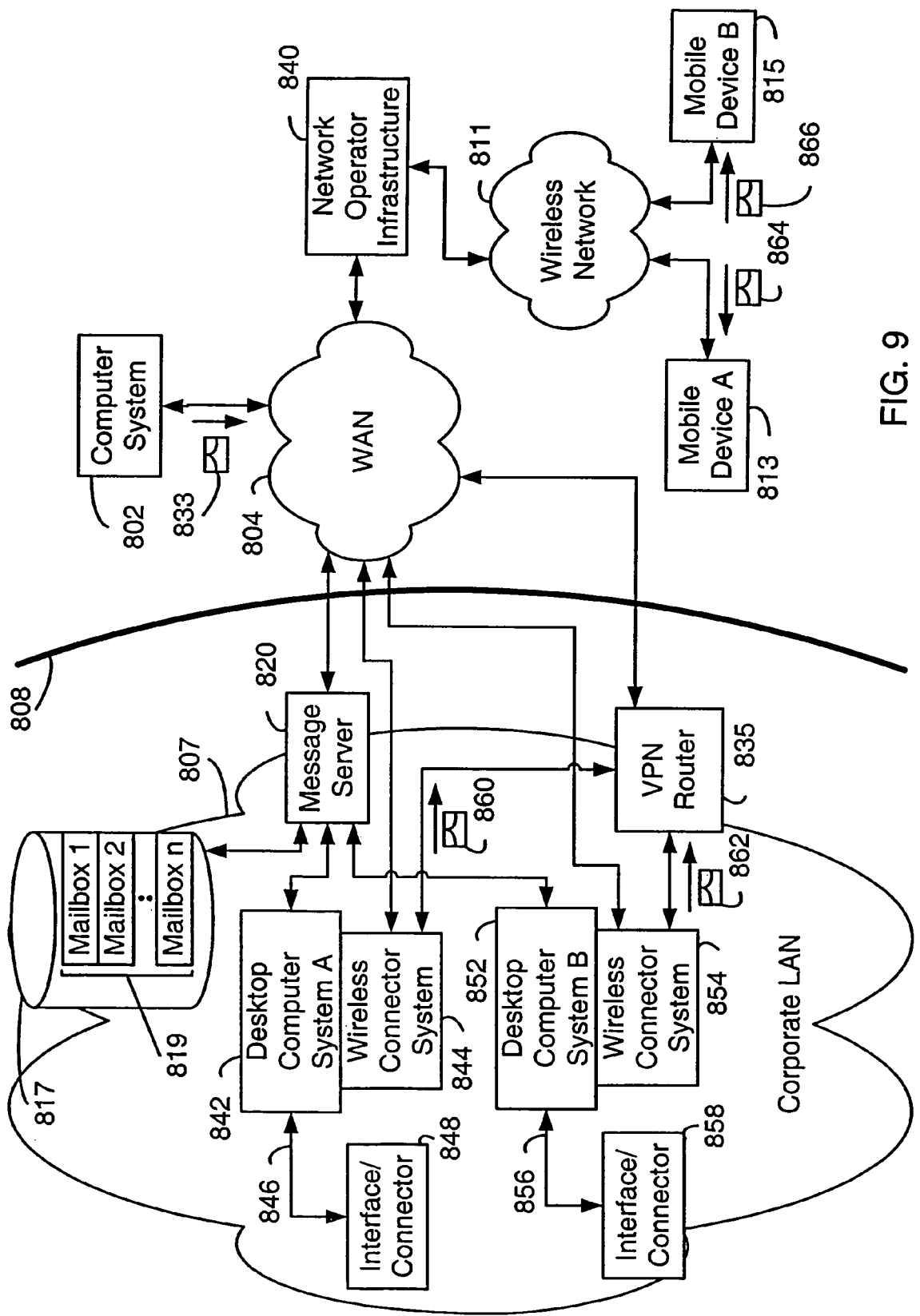
FIG. 9 is a block diagram of an alternative example communication system.
Figure 10:
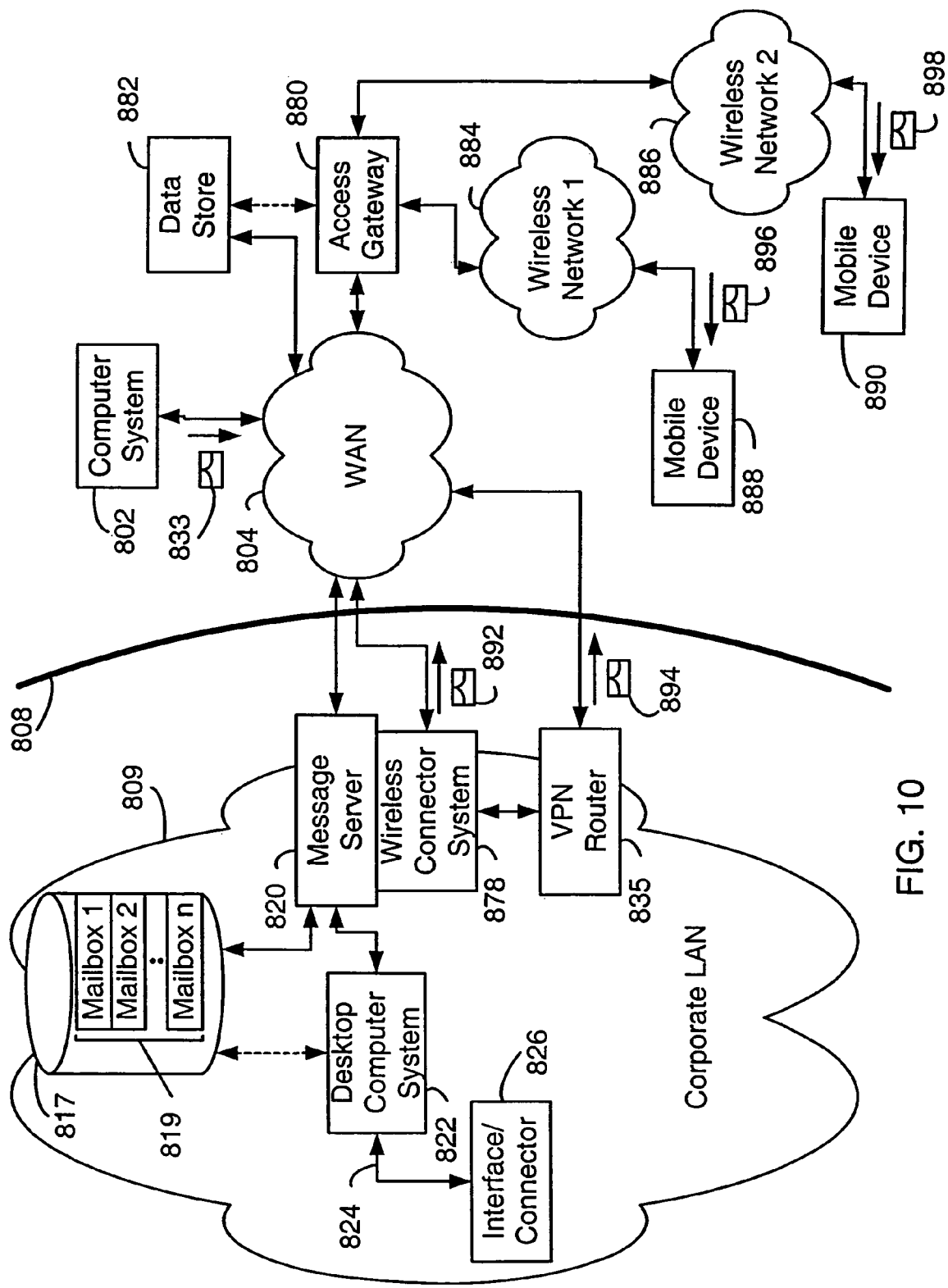
FIG. 10 is a block diagram of another alternative communication system.

Still further examples of the wide scope of the systems and methods disclosed herein are illustrated in FIGS. 8-10. FIGS. 8-10 describe additional uses of the systems and methods within different exemplary communication systems. FIG. 8 is a block diagram showing an example communication system. In FIG. 8, there is shown a computer system 802, a WAN 804, corporate LAN 806 behind a security firewall 808, wireless infrastructure 810, wireless networks 812 and 814, and mobile devices 816 and 818. The corporate LAN 806 includes a message server 820, a wireless connector system 828, a data store 817 including at least a plurality of mailboxes 819, a desktop computer system 822 having a communication link directly to a mobile device such as through physical connection 824 to an interface or connector 826, and a wireless VPN router 832. Operation of the system in FIG. 8 will be described below with reference to the messages 833, 834 and 836.

The computer system 802 may, for example, be a laptop, desktop or palmtop computer system configured for connection to the WAN 804. Such a computer system may connect to the WAN 804 via an ISP or ASP. Alternatively, the computer system 802 may be a network-connected computer system that, like the computer system 822 for example, accesses the WAN 804 through a LAN or other network. Many modern mobile devices are enabled for connection to a WAN through various infrastructure and gateway arrangements, so that the computer system 802 may also be a mobile device.

The corporate LAN 806 is an illustrative example of a central, server-based messaging system that has been enabled for wireless communications. The corporate LAN 806 may be referred to as a "host system", in that it hosts both a data store 817 with mailboxes 819 for messages, as well as possibly further data stores (not shown) for other data items, that may be sent to or received from mobile devices 816 and 818, and the wireless connector system 828, the wireless VPN router 832, or possibly other components enabling communications between the corporate LAN 806 and one or more mobile devices 816 and 818. In more general terms, a host system may be one or more computers at, with or in association with which a wireless connector system is operating. The corporate LAN 806 is one preferred embodiment of a host system, in which the host system is a server computer running within a corporate network environment operating behind and protected by at least one security communications firewall 808. Other possible central host systems include ISP, ASP and other service provider or mail systems. Although the desktop computer system 824 and interface/connector 826 may be located outside such host systems, wireless communication operations may be similar to those described below.

The corporate LAN 806 implements the wireless connector system 828 as an associated wireless communications enabling component, which will normally be a software program, a software application, or a software component built to work with at least one or more message server. The wireless connector system 828 is used to send user-selected information to, and to receive information from, one or more mobile devices 816 and 818, via one or more wireless networks 812 and 814. The wireless connector system 828 may be a separate component of a messaging system, as shown in FIG. 8, or may instead be partially or entirely incorporated into other communication system components. For example, the message server 820 may incorporate a software program, application, or component implementing the wireless connector system 828, portions thereof, or some or all of its functionality.

The message server 820, running on a computer behind the firewall 808, acts as the main interface for the corporation to exchange messages, including for example electronic mail, calendaring data, voice mail, electronic documents, and other PIM data with the WAN 804, which will typically be the Internet. The particular intermediate operations and computers will be dependent upon the specific type of message delivery mechanisms and networks via which messages are exchanged, and therefore have not been shown in FIG. 8. The functionality of the message server 820 may extend beyond message sending and receiving, providing such features as dynamic database storage for data like calendars, todo lists, task lists, e-mail and documentation, as described above.

Message servers such as 820 normally maintain a plurality of mailboxes 819 in one or more data stores such as 817 for each user having an account on the server. The data store 817 includes mailboxes 819 for a number of ("n") user accounts. Messages received by the message server 820 that identify a user, a user account, a mailbox, or possibly another address associated with a user, account or mailbox 819 as a message recipient will typically be stored in the corresponding mailbox 819. If a message is addressed to multiple recipients or a distribution list, then copies of the same message may be stored to more-than one mailbox 819. Alternatively, the message server 820 may store a single copy of such a message in a data store accessible to all of the users having an account on the message server, and store a pointer or other identifier in each recipient's mailbox 819. In typical messaging systems, each user may then access his or her mailbox 819 and its contents using a messaging client such as Microsoft Outlook or Lotus Notes, which normally operates on a PC, such as the desktop computer system 822, connected in the LAN 806. Although only one desktop computer system 822 is shown in FIG. 8, those skilled in the art will appreciate that a LAN will typically contain many desktop, notebook and laptop computer systems. Each messaging client normally accesses a mailbox 819 through the message server 820, although in some systems, a messaging client may enable direct access to the data store 817 and a mailbox 819 stored thereon by the desktop computer system 822. Messages may also be downloaded from the data store 817 to a local data store (not shown) on the desktop computer system 822.

Within the corporate LAN 806, the wireless connector system 828 operates in conjunction with the message server 820. The wireless connector system 828 may reside on the same computer system as the message server 820, or may instead be implemented on a different computer system. Software implementing the wireless connector system 828 may also be partially or entirely integrated with the message server 820. The wireless connector system 828 and the message server 820 are preferably designed to cooperate and interact to allow the pushing of information to mobile devices 816, 818. In such an installation, the wireless connector system 828 is preferably configured to send information that is stored in one or more data stores associated with the corporate LAN 806 to one or more mobile devices 816, 818, through the corporate firewall 808 and via the WAN 804 and one of the wireless networks 812, 814. For example, a user that has an account and associated mailbox 819 in the data store 817 may also have a mobile device, such as 816. As described above, messages received by the message server 820 that identify a user, account or mailbox 819 are stored to a corresponding mailbox 819 by the message server 820. If a user has a mobile device, such as 816, messages received by the message server 820 and stored to the user's mailbox 819 are preferably detected by the wireless connector system 828 and sent to the user's mobile device 816. This type of functionality represents a "push" message sending technique. The wireless connector system 828 may instead employ a "pull" technique, in which items stored in a mailbox 819 are sent to a mobile device 816, 818 responsive to a request or access operation made using the mobile device, or some combination of both techniques.

The use of a wireless connector 828 thereby enables a messaging system including a message server 820 to be extended so that each user's mobile device 816, 818 has access to stored messages of the message server 820. Although the systems and methods described herein are not restricted solely to a push-based technique, a more detailed description of push-based messaging may be found in the United States Patent and Applications incorporated by reference above. This push technique uses a wireless friendly encoding, compression and encryption technique to deliver all information to a mobile device, thus effectively extending the company firewall 808 to include the mobile devices 816, 818.

As shown in FIG. 8, there are several paths for exchanging information with a mobile device 816, 818 from the corporate LAN 806. One possible information transfer path is through the physical connection 824 such as a serial port, using an interface or connector 826. This path may be useful for example for bulk information updates often performed at initialization of a mobile device 816, 818 or periodically when a user of a mobile device 816, 818 is working at a computer system in the LAN 806, such as the computer system 822. For example, as described above, PIM data is commonly exchanged over such a connection, for example a serial port connected to an appropriate interface or connector 826 such as a cradle in or upon which a mobile device 816, 818 may be placed. The physical connection 824 may also be used to transfer other information from a desktop computer system 822 to a mobile device 816, 818, including private security keys ("private keys") such as private encryption or signature keys associated with the desktop computer system 822, or other relatively bulky information such as Certs and CRLs, used in some secure messaging schemes such as S/MIME and PGP.

Private key exchange using a physical connection 824 and connector or interface 826 allows a user's desktop computer system 822 and mobile device 816 or 818 to share at least one identity for accessing all encrypted and/or signed mail. The user's desktop computer system 822 and mobile device 816 or 818 can also thereby share private keys so that either the host system 822 or mobile device 816 or 818 can process secure messages addressed to the user's mailbox or account on the message server 820. The transfer of Certs and CRLs over such a physical connection may be desirable in that they represent a large amount of the data that is required for S/MIME, PGP and other public key security methods. A user's own Cert, a chain of Cert(s) used to verify the user's Cert, and CRL as well as Certs, Cert chains and CRLs for other users, may be loaded onto a mobile device 816, 818 from the user's desktop computer system 822. This loading of other user's. Certs and CRLs onto a mobile device 816, 818 allows a mobile device user to select other entities or users with whom they might be exchanging secure messages, and to pre-load the bulky information onto the mobile device through a physical connection instead of over the air, thus saving time and wireless bandwidth when a secure message is received from or to be sent to such other users, or when the status of a Cert is to be determined.

In known "synchronization" type wireless messaging systems, a physical path has also been used to transfer messages from mailboxes 819 associated with a message server 820 to mobile devices 816 and 818.

Another method for data exchange with a mobile device 816, 818 is over-the-air, through the wireless connector system 828 and using wireless networks 812, 814. As shown in FIG. 8, this could involve a Wireless VPN router 832, if available in the network 806, or, alternatively, a traditional WAN connection to wireless infrastructure 810 that provides an interface to one or more wireless networks 812, 814. The Wireless VPN router 832 provides for creation of a VPN connection directly through a specific wireless network 812 to a wireless device 816. Such a Wireless VPN router 832 may be used in conjunction with a static addressing scheme. For example, if the wireless network 812 is an IP-based wireless network, then IPV6 would provide enough IP addresses to dedicate an IP address to every mobile device 816 configured to operate within the network 812 and thus make it possible to push information to a mobile device 816 at any time. A primary advantage of using a wireless VPN router 832 is that it could be an off-the-shelf VPN component which would not require wireless infrastructure 810. A VPN connection may use a TCP/IP or UDP/IP connection to deliver messages directly to and from a mobile device 816.

If a wireless VPN router 832 is not available, then a link to a WAN 804, normally the Internet, is a commonly used connection mechanism that may be employed by the wireless connector system 828. To handle the addressing of the mobile device 816 and any other required interface functions, wireless infrastructure 810 is preferably used. The wireless infrastructure 810 may also determine a most likely wireless network for locating a given user, and track users as they roam between countries or networks. In wireless networks such as 812 and 814, messages are normally delivered to and from mobile devices 816, 818 via RF transmissions between base stations (not shown) and the mobile devices 816, 818.

A plurality of connections to wireless networks 812 and 814 may be provided, including, for example, ISDN, Frame Relay or T1 connections using the TCP/IP protocol used throughout the Internet. The wireless networks 812 and 814 could represent distinct, unique and unrelated networks, or they could represent the same network in different countries, and may be any of different types of networks, including but not limited to, data-centric wireless networks, voice-centric wireless networks, and dual-mode networks that can support both voice and data communications over the same or similar infrastructure, such as any of those described above.

In some implementations, more than one over-the-air information exchange mechanism may be provided in the corporate LAN 806. In the exemplary communication system of FIG. 8 for example, mobile devices 816, 818 associated with users having mailboxes 819 associated with user accounts on the message server 820 are configured to operate on different wireless networks 812 and 814. If the wireless network 812 supports IPv6 addressing, then the wireless VPN router 832 may be used by the wireless connector system 828 to exchange data with any mobile device 816 operating within the wireless network 812. The wireless network 814 may be a different type of wireless network, however, such as the Mobitex network, in which case information may instead be exchanged with a mobile device 818 operating within the wireless network 814 by the wireless connector system 828 via a connection to the WAN 804 and the wireless infrastructure 810.

Operation of the system in FIG. 8 will now be described using an example of an e-mail message 833 sent from the computer system 812 and addressed to at least one recipient having both an account and mailbox 819 or like data store associated with the message server 820 and a mobile device 816 or 818. However, the e-mail message 833 is intended for illustrative purposes only. The exchange of other types of information between the corporate LAN 806 is preferably also enabled by the wireless connector system 828.

The e-mail message 833, sent from the computer system 802 via the WAN 804, may be fully in the clear, or signed with a digital signature and/or encrypted, depending upon the particular messaging scheme used. For example, if the computer system 802 is enabled for secure messaging using S/MIME, then the e-mail message 833 may be signed, encrypted, or both.

E-mail messages such as 833 normally use traditional SMTP, RFC822 headers and MIME body parts to define the format of the e-mail message. These techniques are all well known to one in the art. The e-mail message 833 arrives at the message server 820, which determines into which mailboxes 819 the e-mail message 833 should be stored. As described above, a message such as the e-mail message 833 may include a user name, a user account, a mailbox identifier, or other type of identifier that may be mapped to a particular account or associated mailbox 819 by the message server 820. For an e-mail message 833, recipients are typically identified using e-mail addresses corresponding to a user account and thus a mailbox 819.

The wireless connector system 828 sends or mirrors, via a wireless network 812 or 814, certain user-selected data items or parts of data items from the corporate LAN 806 to the user's mobile device 816 or 818, preferably upon detecting that one or more triggering events has occurred. A triggering event includes, but is not limited to, one or more of the following: screen saver activation at a user's networked computer system 822, disconnection of the user's mobile device 816 or 818 from the interface 826, or receipt of a command sent from a mobile device 816 or 818 to the host system to start sending one or more messages stored at the host system. Thus, the wireless connector system 828 may detect triggering events associated with the message server 820, such as receipt of a command, or with one or more networked computer systems 822, including the screen saver and disconnection events described above. When wireless access to corporate data for a mobile device 816 or 818 has been activated at the LAN 806, for example when the wireless connector system 828 detects the occurrence of a triggering event for a mobile device user, data items selected by the user are preferably sent to the user's mobile device. In the example of the e-mail message 833, assuming that a triggering event has been detected, the arrival of the message 833 at the message server 820 is detected by the wireless connector system 828. This may be accomplished, for example, by monitoring or querying mailboxes 819 associated with the message server 820, or, if the message server 820 is a Microsoft Exchange server, then the wireless connector system 828 may register for advise syncs provided by the Microsoft Messaging Application Programming Interface (MAPI) to thereby receive notifications when a new message is stored to a mailbox 819.

When a data item such as the e-mail message 833 is to be sent to a mobile device 816 or 818, the wireless connector system 828 preferably repackages the data item in a manner that is transparent to the mobile device, so that information sent to and received by the mobile device appears similar to the information as stored on and accessible at the host system, LAN 806 in FIG. 8. One preferred repackaging method includes wrapping received messages to be sent via a wireless network 812, 814 in an electronic envelope that corresponds to the wireless network address of the mobile device 816, 818 to which the message is to be sent. Alternatively, other repackaging methods could be used, such as special-purpose TCP/IP wrapping techniques. Such repackaging preferably also results in e-mail messages sent from a mobile device 816 or 818 appearing to come from a corresponding host system account or mailbox 819 even though they are composed and sent from a mobile device. A user of a mobile device 816 or 818 may thereby effectively share a single e-mail address between a host system account or mailbox 819 and the mobile device.

Repackaging of the e-mail message 833 is indicated at 834 and 836. Repackaging techniques may be similar for any available transfer paths or may be dependent upon the particular transfer path, either the wireless infrastructure 810 or the wireless VPN router 832. For example, the e-mail message 833 is preferably compressed and encrypted, either before or after being repackaged at 834, to thereby effectively provide for secure transfer to the mobile device 818. Compression reduces the bandwidth required to send the message, whereas encryption ensures confidentiality of any messages or other information sent to mobile devices 816 and 818. In contrast, messages transferred via a VPN router 832 might only be compressed and not encrypted, since a VPN connection established by the VPN router 832 is inherently secure. Messages are thereby securely sent, via either encryption at the wireless connector system 828, which may be considered a non-standard VPN tunnel or a VPN-like connection for example, or the VPN router 832, to mobile devices 816 and 818. Accessing messages using a mobile device 816 or 818 is thus no less secure than accessing mailboxes at the LAN 806 using the desktop computer system 822.

When a repackaged message 834 or 836 arrives at a mobile device 816 or 818, via the wireless infrastructure 810, or via the wireless VPN router 832, the mobile device 816 or 818 removes the outer electronic envelope from the repackaged message 834 or 836, and performs any required decompression and decryption operations. Messages sent from a mobile device 816 or 818 and addressed to one or more recipients are preferably similarly repackaged, and possibly compressed and encrypted, and sent to a host system such as the LAN 806. The host system may then remove the electronic envelope from the repackaged message, decrypt and decompress the message if desired, and route the message to the addressed recipients.

Another goal of using an outer envelope is to maintain at least some of the addressing information in the original e-mail message 833. Although the outer envelope used to route information to mobile devices 816, 818 is addressed using a network address of one or more mobile devices, the outer envelope preferably encapsulates the entire original e-mail message 833, including at least one address field, possibly in compressed and/or encrypted form. This allows original "To", "From" and "CC" addresses of the e-mail message 833 to be displayed when the outer envelope is removed and the message is displayed on a mobile device 816 or 818. The repackaging also allows reply messages to be delivered to addressed recipients, with the "From" field reflecting an address of the mobile device user's account or mailbox on the host system, when the outer envelope of a repackaged outgoing message sent from a mobile device is removed by the wireless connector system 828. Using the user's account or mailbox address from the mobile device 816 or 818 allows a message sent from a mobile device to appear as though the message originated from the user's mailbox 819 or account at the host system rather than the mobile device.

FIG. 9 is a block diagram of an alternative exemplary communication system, in which wireless communications are enabled by a component associated with an operator of a wireless network. As shown in FIG. 9, the system includes a computer system 802, WAN 804, a corporate LAN 807 located behind a security firewall 808, network operator infrastructure 840, a wireless network 811, and mobile devices 813 and 815. The computer system 802, WAN 804, security firewall 808, message server 820, data store 817, mailboxes 819, and VPN router 835 are substantially the same as the similarly-labelled components in FIG. 8. However, since the VPN router 835 communicates with the network operator infrastructure 840, it need not necessarily be a wireless VPN router in the system of FIG. 9. The network operator infrastructure 840 enables wireless information exchange between the LAN 807 and mobile devices 813, 815, respectively associated with the computer systems 842 and 852 and configured to operate within the wireless network 811. In the LAN 807, a plurality of desktop computer systems 842, 852 are shown, each having a physical connection 846, 856 to an interface or connector 848, 858. A wireless connector system 844, 854 is operating on or in conjunction with each computer system 842, 852.

The wireless connector systems 844, 854 are similar to the wireless connector system 828 described above, in that it enables data items, such as e-mail messages and other items that are stored in mailboxes 819, and possibly data items stored in a local or network data store, to be sent from the LAN 807 to one or more mobile devices 813, 815. In FIG. 9 however, the network operator infrastructure 840 provides an interface between the mobile devices 813, 815 and the LAN 807. As above, operation of the system shown in FIG. 9 will be described below in the context of an e-mail message as an illustrative example of a data item that may be sent to a mobile device 813, 815.

When an e-mail message 833, addressed to one or more recipients having an account on the message server 820, is received by the message server 820, the message, or possibly a pointer to a single copy of the message stored in a central mailbox or data store, is stored into the mailbox 819 of each such recipient. Once the e-mail message 833 or pointer has been stored to a mailbox 819, it may preferably be accessed using a mobile device 813 or 815. In the example shown in FIG. 9, the e-mail message 833 has been addressed to the mailboxes 819 associated with both desktop computer systems 842 and 852 and thus both mobile devices 813 and 815.

As those skilled in the art will appreciate, communication network protocols commonly used in wired networks such as the LAN 807 and/or the WAN 804 are not suitable or compatible with wireless network communication protocols used within wireless networks such as 811. For example, communication bandwidth, protocol overhead and network latency, which are primary concerns in wireless network communications, are less significant in wired networks, which typically have much higher capacity and speed than wireless networks. Therefore, mobile devices 813 and 815 cannot normally access the data store 817 directly. The network operator infrastructure 840 provides a bridge between the wireless network 811 and the LAN 807.

The network operator infrastructure 840 enables a mobile device 813, 815 to establish a connection to the LAN 807 through the WAN 804, and may, for example, be operated by an operator of the wireless network 811 or a service provider that provides wireless communication service for mobile devices 813 and 815. In a pull-based system, a mobile device 813, 815 may establish a communication session with the network operator infrastructure 840 using a wireless network compatible communication scheme, preferably a secure scheme such as Wireless Transport Layer Security (WTLS) when information should remain confidential, and a wireless web browser such as a Wireless Application Protocol (WAP) browser. A user may then request (through manual selection or pre-selected defaults in the software residing in the mobile device) any or all information, or just new information for example, stored in a mailbox 819 in the data store 817 at the LAN 807. The network operator infrastructure 840 then establishes a connection or session with a wireless connector system 844, 854, using Secure Hypertext Transfer Protocol (HTTPS) for example, if no session has already been established. As above, a session between the network operator infrastructure 840 and a wireless connector system 844, 854 may be made via a typical WAN connection or through the VPN router 835 if available. When time delays between receiving a request from a mobile device 813, 815 and delivering requested information back to the device are to be minimized, the network operator infrastructure 840 and the wireless connector systems 844, 854 may be configured so that a communication connection remains open once established.

In the system of FIG. 9, requests originating from mobile device A 813 and B 815 would be sent to the wireless connector systems 844 and 854, respectively. Upon receiving a request for information from the network operator infrastructure 840, a wireless connector system 844, 854 retrieves requested information from a data store. For the e-mail message 833, the wireless connector system 844, 854 retrieves the e-mail message 833 from the appropriate mailbox 819, typically through a messaging client operating in conjunction with the computer system 842, 852, which may access a mailbox 819 either via the message server 820 or directly. Alternatively, a wireless connector system 844, 854 may be configured to access mailboxes 819 itself, directly or through the message server 820. Also, other data stores, both network data stores similar to the data store 817 and local data stores associated with each computer system 842, 852, may be accessible to a wireless connector system 844, 854, and thus to a mobile device 813, 815.

If the e-mail message 833 is addressed to the message server accounts or mailboxes 819 associated with both computer systems 842 and 852 and devices 813 and 815, then the e-mail message 833 may be sent to the network operator infrastructure 840 as shown, at 860 and 862, which then sends a copy of the e-mail message to each mobile device 813 and 815, as indicated at 864 and 866. Information may be transferred between the wireless connector systems 844, 854 and the network operator infrastructure 840 via either a connection to the WAN 804 or the VPN router 835. When the network operator infrastructure 840 communicates with the wireless connector systems 844, 854 and the mobile devices 813, 815 via different protocols, translation operations may be performed by the network operator infrastructure 840. Repackaging techniques may also be used between the wireless connector systems 844, 854 and the network operator infrastructure 840, and between each mobile device 813, 815 and the network operator infrastructure 840.

Messages or other information to be sent from a mobile device 813, 815 may be processed in a similar manner, with such information first being transferred from a mobile device 813, 815 to the network operator infrastructure 840. The network operator infrastructure 840 may then send the information to a wireless connector system 844, 854 for storage in a mailbox 819 and delivery to any addressed recipients by the message server 820 for example, or may alternatively deliver the information to the addressed recipients.

The above description of the system in FIG. 9 relates to pull-based operations. The wireless connector systems 844, 854 and the network operator infrastructure may instead be configured to push data items to mobile devices 813 and 815. A combined push/pull system is also possible. For example, a notification of a new message or a list of data items currently stored in a data store at the LAN 807 could be pushed to a mobile device 813, 815, which may then be used to request messages or data items from the LAN 807 via the network operator infrastructure 840.

If mobile devices associated with user accounts on the LAN 807 are configured to operate within different wireless networks, then each wireless network may have an associated wireless network infrastructure component similar to 840.

Although separate, dedicated wireless connector systems 844, 854 are shown for each computer system 842, 852 in the system of FIG. 9, one or more of the wireless connector systems 844, 854 may preferably be configured to operate in conjunction with more than one computer system 842, 852, or to access a data store or mailbox 819 associated with more than one computer system. For example, the wireless connector system 844 may be granted access to the mailboxes 819 associated with both the computer system 842 and the computer system 852. Requests for data items from either mobile device A 813 or B 815 may then be processed by the wireless connector system 844. This configuration may be useful to enable wireless communications between the LAN 807 and the mobile devices 813 and 815 without requiring a desktop computer system 842, 852 to be running for each mobile device user. A wireless connector system may instead be implemented in conjunction with the message server 820 to enable wireless communications.

FIG. 10 is a block diagram of another alternative communication system. The system includes a computer system 802, WAN 804, a corporate LAN 809 located behind a security firewall 808, an access gateway 880, data store 882, wireless networks 884 and 886, and mobile devices 888 and 890. In the LAN 809, the computer system 802, WAN 804, security firewall 808, message server 820, data store 817, mailboxes 819, desktop computer system 822, physical connection 824, interface or connector 826 and VPN router 835 are substantially the same as the corresponding components described above. The access gateway 880 and data store 882 provide mobile devices 888 and 890 with access to data items stored at the LAN 809. In FIG. 10, a wireless connector system 878 operates on or in conjunction with the message server 820, although a wireless connector system may instead operate on or in conjunction with one or more desktop computer systems in the LAN 809.

The wireless connector system 878 provides for transfer of data items stored at the LAN 809 to one or more mobile devices 888, 890. These data items preferably include e-mail messages stored in mailboxes 819 in the data store 817, as well as possibly other items stored in the data store 817 or another network data store or a local data store of a computer system such as 822.

As described above, an e-mail message 833 addressed to one or more recipients having an account on the message server 820 and received by the message server 820 may be stored into the mailbox 819 of each such recipient In the system of FIG. 10, the external data store 882 preferably has a similar structure to, and remains synchronized with, the data store 817. PIM information or data stored at data store 882 preferably is independently modifiable to the PIM information or data stored at the host system. In this particular configuration, the independently modifiable information at the external data store 882 may maintain synchronization of a plurality of data stores associated with a user (i.e., data on a mobile device, data on a personal computer at home, data at the corporate LAN, etc.). This synchronization may be accomplished, for example, through updates sent to the data store 882 by the wireless connector system 878 at certain time intervals, each time an entry in the data store 817 is added or changed, at certain times of day, or when initiated at the LAN 809, by the message server 820 or a computer system 822, at the data store 882, or possibly by a mobile device 888, 890 through the access gateway 880. In the case of the e-mail message 833 for example, an update sent to the data store 882 some time after the e-mail message 833 is received may indicate that the message 833 has been stored in a certain mailbox 819 in the store 817, and a copy of the e-mail message will be stored to a corresponding storage area in the data store 882. When the e-mail message 833 has been stored in the mailboxes 819 corresponding to the mobile devices 888 and 890 for example, one or more copies of the e-mail message, indicated at 892 and 894 in FIG. 10, will be sent to and stored in corresponding storage areas or mailboxes in the data store 882. As shown, updates or copies of stored information in the data store 817 may be sent to the data store 882 via a connection to the WAN 804 or the VPN router 835. For example, the wireless connector system 878 may post updates or stored information to a resource in the data store 882 via an HTTP post request. Alternatively, a secure protocol such as HTTPS or Secure Sockets Layer (SSL) may be used. Those skilled in the art will appreciate that a single copy of a data item stored in more than one location in a data store at the LAN 809 may instead be sent to the data store 882. This copy of the data item could then be stored either in more than one corresponding location in the data store 882, or a single copy may be stored in the data store 882, with a pointer or other identifier of the stored data item being stored in each corresponding location in the data store 882.

The access gateway 880 is effectively an access platform, in that it provides mobile devices 888 and 890 with access to the data store 882. The data store 882 may be configured as a resource accessible on the WAN 804, and the access gateway 880 may be an ISP system or WAP gateway through which mobile devices 888 and 890 may connect to the WAN 804. A WAP browser or other browser compatible with the wireless networks 884 and 886 may then be used to access the data store 882, which is synchronized with the data store 817, and download stored data items either automatically or responsive to a request from a mobile device 888, 890. As shown at 896 and 898, copies of the e-mail message 833, which was stored in the data store 817, may be sent to the mobile devices 888 and 890. A data store (not shown) on each mobile device 888, 890 may thereby be synchronized with a portion, such as a mailbox 819, of a data store 817 on a corporate LAN 809. Changes to a mote device data store may similarly be reflected in the data stores 882 and 817.

Figure 11:
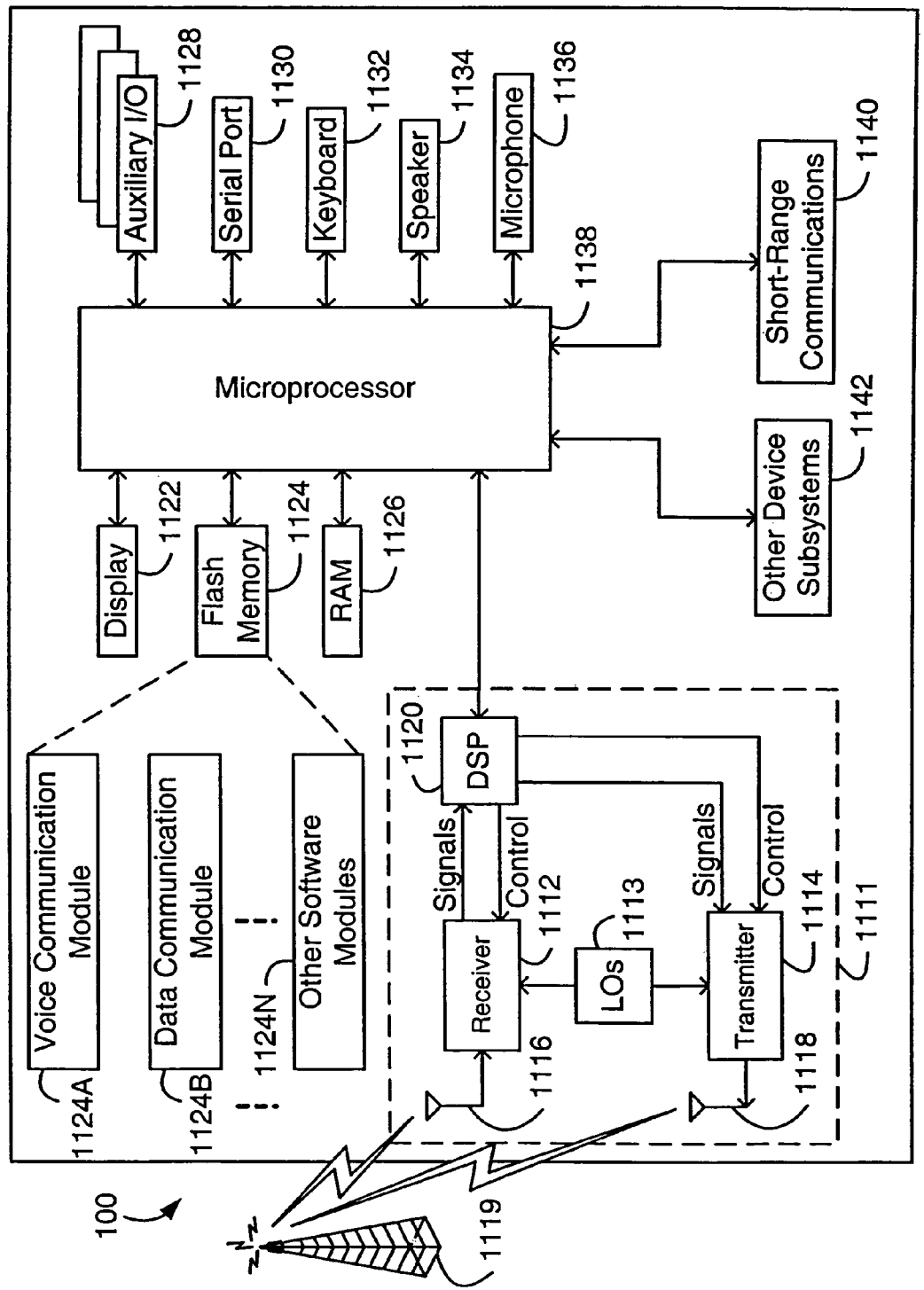
FIG. 11 is a block diagram of an example mobile device.

FIG. 11 is a block diagram of an example mobile device. The mobile device 100 is a dual-mode mobile device and includes a transceiver 1111, a microprocessor 1138, a display 1122, Flash memory 1124, random access memory (RAM) 1126, one or more auxiliary input/output (I/O) devices 1128, a serial port 1130, a keyboard 1132, a speaker 1134, a microphone 1136, a short-range wireless communications sub-system 1140, and may also include other device subsystems 1142.

The transceiver 1111 includes a receiver 1112, a transmitter 1114, antennas 1116 and 1118, one or more local oscillators 1113, and a digital signal processor (DSP) 1120. The antennas 1116 and 1118 may be antenna elements of a multiple-element antenna, and are preferably embedded antennas. However, the systems and methods described herein are in no way restricted to a particular type of antenna, or even to wireless communication devices.

Within the Flash memory 1124, the device 100 preferably includes a plurality of software modules 1124A-1124N that can be executed by the microprocessor 1138 (and/or the DSP 1120), including a voice communication module 1124A, a data communication module 1124B, and a plurality of other operational modules 1124N for carrying out a plurality of other functions.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 11 by the communication tower 1119. These voice and data networks may be separate communication networks using separate infrastructure, such as base stations, network controllers, etc., or they may be integrated into a single wireless network.

The transceiver 1111 is used to communicate with the network or networks 1119, and includes the receiver 1112, the transmitters 1114, the one or more local oscillators 1113 and may also include the DSP 1120. The DSP 1120 is used to send and receive signals to and from the transceivers 1116 and 1118, and may also provide control information to the receiver 1112 and the transmitter 1114. If the voice and data communications occur at a single frequency, or closely-spaced sets of frequencies, then a single local oscillator 1113 may be used in conjunction with the receiver 1112 and the transmitter 1114. Alternatively, if different frequencies are utilized for voice communications versus data communications for example, then a plurality of local oscillators 1113 can be used to generate a plurality of frequencies corresponding to the voice and data networks 1119. Information, which includes both voice and data information, is communicated to and from the transceiver 1111 via a link between the DSP 1120 and the microprocessor 1138.

The detailed design of the transceiver 1111, such as frequency band, component selection, power level, etc., will be dependent upon the communication network 1119 in which the mobile device 100 is intended to operate. For example, a mobile device 100 intended to operate in a North American market may include a transceiver 1111 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 1119, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 1119, other than any legally required operations, such as '911' emergency calling.

After any required network registration or activation procedures have been completed, the mobile device 100 may the send and receive communication signals, including both voice and data signals, over the networks 1119. Signals received by the antenna 1116 from the communication network 1119 are routed to the receiver 1112, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 1120. In a similar manner, signals to be transmitted to the network 1119 are processed, including modulation and encoding, for example, by the DSP 1120 and are then provided to the transmitter 1114 for digital to analog conversion, frequency up conversion, filtering, amplification and transmission to the communication network 1119 via the antenna 1118.

In addition to processing the communication signals, the DSP 1120 also provides for transceiver control. For example, the gain levels applied to communication signals in the receiver 1112 and transmitter 1114 may be adaptively controlled through automatic gain control algorithms implemented in the DSP 1120. Other transceiver control algorithms could also be implemented in the DSP 1120 in order to provide more sophisticated control of the transceiver 1111.

The microprocessor 1138 preferably manages and controls the overall operation of the mobile device 100. Many types of microprocessors or microcontrollers could be used here, or, alternatively, a single DSP 1120 could be used to carry out the functions of the microprocessor 1138. Low-level communication functions, including at least data and voice communications, are performed through the DSP 1120 in the transceiver 1111. Other, high-level communication applications, such as a voice communication application 1124A, and a data communication application 1124B may be stored in the Flash memory 1124 for execution by the microprocessor 1138. For example, the voice communication module 1124A may provide a high-level user interface operable to transmit and receive voice calls between the mobile device 100 and a plurality of other voice or dual-mode devices via the network 1119. Similarly, the data communication module 1124B may provide a high-level user interface operable for sending and receiving data, such as e-mail messages, files, organizer information, short text messages, etc., between the mobile device 100 and a plurality of other data devices via the networks 1119.

The microprocessor 1138 also interacts with other device subsystems, such as the display 1122, Flash memory 1124, RAM 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 11 perform communication-related functions, whereas other subsystems may provide "resident" or on-device functions. Notably, some subsystems, such as keyboard 1132 and display 1122 may be used for both communication-related functions, such as entering a text message for transmission over a data communication network, and device-resident functions such as a calculator or task list or other PDA type functions.

Operating system software used by the microprocessor 1138 is preferably stored in a persistent store such as Flash memory 1124. In addition to the operating system, which controls low-level functions of the mobile device 1110, the Flash memory 1124 may include a plurality of high-level software application programs, or modules, such as a voice communication module 1124A, a data communication module 1124B, an organizer module (not shown), or any other type of software module 1124N. These modules are executed by the microprocessor 1138 and provide a high-level interface between a user and the mobile device 100. This interface typically includes a graphical component provided through the display 1122, and an input/output component provided through the auxiliary I/O 1128, keyboard 1132, speaker 1134, and microphone 1136. The operating system, specific device applications or modules, or parts thereof, may be temporarily loaded into a volatile store, such as RAM 1126 for faster operation. Moreover, received communication signals may also be temporarily stored to RAM 1126, before permanently writing them to a file system located in a persistent store such as the Flash memory 1124.

An exemplary application module 1124N that may be loaded onto the mobile device 100 is a personal information manager (PIM) application providing PDA functionality, such as calendar events, appointments, and task items. This module 1124N may also interact with the voice communication module 1124A for managing phone calls, voice mails, etc., and may also interact with the data communication module for managing e-mail communications and other data transmissions. Alternatively, all of the functionality of the voice communication module 1124A and the data communication module 1124B may be integrated into the PIM module.

The Flash memory 1124 preferably also provides a file system to facilitate storage of PIM data items on the device. The PIM application preferably includes the ability to send and receive data items, either by itself, or in conjunction with the voice and data communication modules 1124A, 1124B, via the wireless networks 1119. The PIM data items are preferably seamlessly integrated, synchronized and updated, via the wireless networks 1119, with a corresponding set of data items stored or associated with a host computer system, thereby creating a mirrored system for data items associated with a particular user.

Decrypted session keys or other encryption accessing information is preferably stored on the mobile device 100 in a volatile and non-persistent store such as the RAM 1126. Such information may instead be stored in the Flash memory 1124, for example, when storage intervals are relatively short, such that the information is removed from memory soon after it is stored. However, storage of this information in the RAM 1126 or another volatile and non-persistent store is preferred, in order to ensure that the information is erased from memory when the mobile device 100 loses power. This prevents an unauthorized party from obtaining any stored encryption accessing information such as a decrypted session key by removing a memory chip from the mobile device 100, for example.

The mobile device 100 may be manually synchronized with a host system by placing the device 100 in an interface cradle, which couples the serial port 1130 of the mobile device 100 to the serial port of a computer system or device. The serial port 1130 may also be used to enable a user to set preferences through an external device or software application, or to download other application modules 1124N for installation. This wired download path may be used to load an encryption key onto the device, which is a more secure method than exchanging encryption information via the wireless network 1119. Interfaces for other wired download paths may be provided in the mobile device 100, in addition to or instead of the serial port 1130. For example, a USB port would provide an interface to a similarly equipped personal computer.

Additional application modules 1124N may be loaded onto the mobile device 100 through the networks 1119, through an auxiliary I/O subsystem 1128, through the serial port 1130, through the short-range communications subsystem 1140, or through any other suitable subsystem 1142, and installed by a user in the Flash memory 1124 or RAM 1126. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, will be processed by the transceiver module 1111 and provided to the microprocessor 1138, which will preferably further process the received signal for output to the display 1122, or, alternatively, to an auxiliary I/O device 1128. A user of mobile device 100 may also compose data items, such as e-mail messages, using the keyboard 1132, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 1128, which may include a thumb-wheel input device, a touchpad, a variety of switches, a rocker input switch, etc. The composed data items input by the user may then be transmitted over the communication networks 1119 via the transceiver module 1111.

When the mobile device 100 is operating in a voice communication mode, the overall operation of the mobile device is substantially similar to the data mode, except that received signals are preferably be output to the speaker 1134 and voice signals for transmission are generated by a microphone 1136. Alternative voice or audio I/O subsystems, such as a voice message recording subsystem, may also be implemented on the mobile device 100. Although voice or audio signal output is preferably accomplished primarily through the speaker 1134, the display 1122 may also be used to provide an indication of the identity of a calling party, the duration of a voice call, or other voice call related information. For example, the microprocessor 1138, in conjunction with the voice communication module and the operating system software, may detect the caller identification information of an incoming voice call and display it on the display 1122.

A short-range communications subsystem 1140 may also be included in the mobile device 100. For example, the subsystem 1140 may include an infrared device and associated circuits and components, or a short-range RF communication module such as a Bluetooth™ module or an 802.11 module to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

What is claimed as the invention is:

1. A method for processing encrypted e-mail messages at a communication device, the method comprising:
   receiving at the communication device an encrypted e-mail message comprising at least one encrypted session key and encrypted content, the at least one encrypted session key comprising an individual encrypted session key associated with the communication device, the individual encrypted session key encrypted with a public key and usable, when decrypted using a private key associated with the public key, to decrypt the encrypted content of the encrypted e-mail message;
   accessing the encrypted e-mail message;
   identifying the individual encrypted session key associated with the communication device;
   decrypting the individual encrypted session key to obtain a decrypted session key that is unique to the encrypted e-mail message; and
   storing the decrypted session key to memory;
   wherein, when the encrypted content of the encrypted e-mail message is accessed multiple times, the stored decrypted session key is used each of the multiple times to decrypt the encrypted content of the encrypted e-mail message, and
   wherein the decrypted session key is removed from the memory based upon a sensitivity level of the encrypted e-mail message.

2. The method of claim 1, wherein the encrypted e-mail message is received by the communication device through a wireless infrastructure and a wireless network.

3. The method of claim 2, wherein a message server transmits the encrypted e-mail message through the wireless infrastructure and the wireless network to the communication device.

4. The method of claim 3, wherein the message server receives the encrypted e-mail message from a message sender.

5. The method of claim 4, wherein the communication device requests in a pull message access scheme that stored e-mail messages be forwarded by the message server to the communication device.

6. The method of claim 4, wherein the message server routes the encrypted e-mail message to the communication device when the encrypted e-mail message is received at the message server, and wherein the encrypted e-mail message is addressed by the message sender using a specific e-mail address associated with the communication device.

7. The method of claim 4, wherein the message server redirects the encrypted e-mail message to the communication device.

8. The method of claim 7, wherein, before the encrypted e-mail message is redirected to the communication device, a redirection program re-envelopes the encrypted e-mail message so as to maintain addressing information of the encrypted e-mail message.

9. The method of claim 8, wherein the redirection program re-envelopes the encrypted e-mail message so as to allow a reply message generated by the communication device to reach the message sender.

10. The method of claim 1, further comprising, after the step of identifying, the steps of:
determining whether the encrypted session key has been decrypted and stored to the memory; and
retrieving the decrypted session key from the memory and using the stored decrypted session key to decrypt the encrypted content of the encrypted e-mail message when the encrypted session key has been decrypted and stored to the memory.

11. The method of claim 10, wherein the steps of decrypting and storing are performed where the encrypted session key has not been decrypted and stored to the memory.

12. The method of claim 1, wherein certificate information of a user of the communication device is transferred to the communication device through a wireless communication module.

13. The method of claim 1, wherein certificate revocation lists are transferred to the communication device through a wireless communication module.

14. The method of claim 1, wherein a message server transmits the encrypted e-mail message through a wireless infrastructure and a wireless network to the communication device, wherein the encrypted e-mail message comprises a plurality of encrypted session keys, wherein the message server determines the encrypted session key associated with the communication device, and wherein the message server reorganizes the encrypted e-mail message such that the encrypted e-mail message is sent to the communication device without containing at least one encrypted session key that is not associated with the communication device.

15. The method of claim 14, wherein the encrypted e-mail message comprises a digital signature, and wherein the message server verifies the digital signature and sends to the communication device a result of the digital signature verification.

16. The method of claim 1, wherein the encrypted e-mail message comprises a plurality of encrypted session keys, wherein the encrypted session keys are associated with different recipients, and wherein the encrypted e-mail message is reorganized prior to transmission to the communication device containing only the encrypted session key associated with the communication device.

17. The method of claim 16, wherein the encrypted e-mail message comprises a digital signature, and wherein the message server verifies the digital signature and sends to the communication device a result of the digital signature verification.

18. The method of claim 1, wherein the encrypted session key is a one-time session key that is generated and used for the encrypted e-mail message.

19. The method of claim 18, wherein the session key was encrypted using a public key associated with the communication device.

20. The method of claim 19, wherein the encrypted e-mail message was addressed to a plurality of recipients, and wherein the same session key is encrypted using a public key associated with each recipient.

21. The method of claim 1, wherein the encrypted content was encrypted using a session key and encryption algorithm, and wherein a public key cryptographic algorithm was used to encrypt the session key to generate the encrypted session key.

22. The method of claim 1, wherein the encrypted e-mail message was encrypted using Secure Multipurpose Internet Mail Extensions (S/MIME) techniques.

23. The method of claim 1, wherein the encrypted e-mail message was encrypted using Pretty Good Privacy techniques.

24. The method of claim 1, wherein the encrypted e-mail message was encrypted using OpenPGP techniques.

25. The method of claim 1, wherein the encrypted e-mail message comprises a digital signature.

26. The method of claim 1, wherein the decrypted session key is removed from the memory after a preselected time has elapsed.

27. The method of claim 26, wherein the preselected time is selected by a user.

28. The method of claim 1, wherein the decrypted session key is removed from the memory based upon electrical power being removed from the communication device.

29. The method of claim 1, wherein the decrypted session key is removed from the memory based upon an identity of a sender of the encrypted e-mail message.

30. The method of claim 29, wherein the identity of the sender of the encrypted e-mail message comprises an e-mail address of the sender.

31. The method of claim 1, wherein the sensitivity level is determined based upon a subject line contained within the encrypted e-mail message.

32. The method of claim 1, wherein the sensitivity level is determined based upon the encrypted content.

33. The method of claim 1, further comprising the step of:
setting a disabling flag so that the decrypted session key is not continuously stored in the memory for use in additional accesses of the encrypted content.

34. The method of claim 1, further comprising the step of:
setting a disabling flag so that the decrypted session key is removed from the memory after accessing the encrypted content.

35. The method of claim 1, wherein the decrypted session key is stored to a volatile memory of the communication device.

36. The method of claim 1, wherein the decrypted session key is stored to a volatile and non-persistent memory of the communication device.

37. The method of claim 1, wherein the decrypted session key is stored to a random access memory (RAM) of the communication device.

38. The method of claim 1, wherein a user interface of the communication receives security information in order to have the encrypted session key decrypted.

39. The method of claim 38, wherein the security information comprises a password.

40. Non-transitory computer-readable memory encoded with program code for processing an encrypted e-mail message at a communication device when the encrypted e-mail message is accessed, wherein the encrypted e-mail message comprises at least one encrypted session key and encrypted content, the at least one encrypted session key comprising an individual encrypted session key associated with the communication device, the individual encrypted session key encrypted with a public key and usable, when decrypted using a private key associated with the public key, to decrypt the encrypted content of the encrypted e-mail message, wherein execution of the program code results in:
- identifying the individual encrypted session key associated with the communication device;
- decrypting the individual encrypted session key to obtain a decrypted session key that is unique to the encrypted e-mail message;
- storing the decrypted session key to memory; and
- when the encrypted content of the encrypted e-mail message is accessed multiple times, using the stored decrypted session key each of the multiple times to decrypt the encrypted content of the encrypted e-mail message,
- wherein the decrypted session key is removed from the memory based upon a sensitivity level of the encrypted e-mail message.

41. An apparatus on a communication device for handling multiple accesses to encrypted e-mail messages, wherein an encrypted e-mail message comprises at least one encrypted session key and encrypted content, wherein the at least one encrypted session key comprises an individual encrypted session key associated with the communication device, the individual encrypted session key encrypted with a public key and usable, when decrypted using a private key associated with the public key, to decrypt the encrypted content of the encrypted e-mail message, and wherein the encrypted e-mail message is transmitted to the communication device, the apparatus comprising:
- a storage software module that executes on a data processor of the communication device and that identifies the individual encrypted session key associated with the communication device, decrypts the individual encrypted session key to obtain a decrypted session key that is unique to the encrypted e-mail message, and stores the decrypted session key in memory which is volatile and non-persistent, wherein the stored decrypted session key allows access to the encrypted content; and
- an accessing software module that executes on the data processor of the communication device and that retrieves from the memory the stored decrypted session key,
- wherein, when the encrypted content of the encrypted e-mail message is accessed multiple times, the retrieved stored decrypted session key is used each of the multiple times to decrypt the encrypted content of the encrypted e-mail message,
- wherein the decrypted session key is removed from the memory based upon a sensitivity level of the encrypted e-mail message.

42. The apparatus of claim 41, wherein the encrypted e-mail message further comprises a digital signature, wherein the storage software module is configured to store, in the memory, verification information about the digital signature, and wherein the accessing software module is configured to retrieve from the memory the verification information when the encrypted content is accessed multiple times.

43. The apparatus of claim 42, further comprising a data structure stored in the memory for containing the verification information and the at least one encrypted session key.

44. The apparatus of claim 43, wherein the data structure includes an association that is indicative of which at least one encrypted session key is associated with which of a plurality of encrypted e-mail messages.

45. The apparatus of claim 44, wherein the data structure includes an association that is indicative of which verification information is associated with which of the plurality of encrypted e-mail messages.

* * * * *